US012689670B2

(12) United States Patent (10) Patent No.: US 12,689,670 B2
Bouabane et al. (45) Date of Patent: Jul. 21, 2026

(54) SYSTEMS AND METHODS FOR MONITORING HEALTH OF A DIGITAL APPLICATION SYSTEM

(71) Applicant: The PNC Financial Services Group, Inc., Pittsburgh, PA (US)

(72) Inventors: Sam Lith Bouabane, Pittsburgh, PA (US); Colin Patrick Spratt, Pittsburgh, PA (US); Matthew Robert Bollinger, Gibsonia, PA (US)

(73) Assignee: The PNC Financial Services Group, Inc., Pittsburgh, PA (US)

( * ) Notice: Subject to any disclaimer, the term of this patent is extended or adjusted under 35 U.S.C. 154(b) by 97 days.

(21) Appl. No.: 18/933,066

(22) Filed: Oct. 31, 2024

(65) Prior Publication Data

US 2025/0286922 A1 Sep. 11, 2025

Related U.S. Application Data

(60) Provisional application No. 63/562,792, filed on Mar. 8, 2024.

(51) Int. Cl.
H04L 67/025 (2022.01)
G06F 11/30 (2006.01)
(52) U.S. Cl.
CPC .......... H04L 67/025 (2013.01); G06F 11/302 (2013.01)
(58) Field of Classification Search
CPC .. H04L 67/025; G06F 11/302; G06F 11/3055; G06F 11/3409
See application file for complete search history.

(56) References Cited

U.S. PATENT DOCUMENTS

| | | | | |
|---|---|---|---|---|
| 8,954,553 B1 * | 2/2015 | Colton | ................ | H04L 67/025 |
| | | | | 709/224 |
| 10,860,675 B2 * | 12/2020 | Ashby | .................. | G06F 16/958 |
| 11,665,221 B2 * | 5/2023 | Joshi | ...................... | H04L 67/10 |
| | | | | 709/203 |
| 11,727,016 B1 * | 8/2023 | Agarwal | ............ | G06F 16/2428 |
| | | | | 707/769 |
| 11,991,059 B1 * | 5/2024 | Gambhir | ............... | H04L 43/067 |
| 2002/0054169 A1 * | 5/2002 | Richardson | ......... | H04L 41/0893 |
| | | | | 715/854 |

(Continued)

*Primary Examiner* — Muhammad Raza
(74) *Attorney, Agent, or Firm* — Finnegan, Henderson, Farabow, Garrett & Dunner, LLP

(57) ABSTRACT

Computer-implemented systems and methods for monitoring the health of a digital application system include a health user interface and a health application programming interface (API). The health user interface may display pages that include a deployment marked in the user interface responsive to health status. The deployment includes pods having containers displaying with health information. The health API may host a page update process, a deployment update process, and a deployment health history purge process, configured to link page structure information and deployment information to display on the health user interface. The page update process updates pages based on a routelog run by a first scheduled period. The deployment update process updates deployment information from a deployment API through a deployment client by a second scheduled period. The deployment health history purge process deletes deployment entries older than a predetermined date by a third scheduled period.

18 Claims, 15 Drawing Sheets

(56) References Cited

U.S. PATENT DOCUMENTS

| | | | |
|---|---|---|---|
| 2011/0261055 A1* | 10/2011 | Wong | H04L 41/0609 345/440 |
| 2013/0332430 A1* | 12/2013 | Margalit | G06F 11/302 707/E17.005 |
| 2014/0071808 A1* | 3/2014 | Snell | H04L 41/0661 370/216 |
| 2014/0079207 A1* | 3/2014 | Zhakov | H04M 3/5233 379/265.03 |
| 2014/0201642 A1* | 7/2014 | Vicat-Blanc | H04L 41/5096 715/736 |
| 2015/0358391 A1* | 12/2015 | Moon | G06F 11/3409 709/224 |
| 2016/0094431 A1* | 3/2016 | Hall | G06F 16/904 709/224 |
| 2017/0371968 A1* | 12/2017 | Horowitz | G06F 16/90335 |
| 2019/0188107 A1* | 6/2019 | Alston | G06F 9/5072 |
| 2019/0238422 A1* | 8/2019 | Raney | H04L 41/20 |
| 2020/0127903 A1* | 4/2020 | Chintala | H04L 41/142 |
| 2020/0218580 A1* | 7/2020 | Kim | G06F 9/5072 |
| 2022/0138070 A1* | 5/2022 | Mokashi | G06F 9/5072 709/224 |
| 2022/0414187 A1* | 12/2022 | Seck | G06F 11/3093 |
| 2023/0128408 A1* | 4/2023 | Vrinda | H04L 43/045 715/744 |
| 2024/0146533 A1* | 5/2024 | Constable | H04L 9/0825 |
| 2024/0330025 A1* | 10/2024 | Waterman | G06F 9/452 |
| 2024/0364689 A1* | 10/2024 | Potlapally | H04L 9/0891 |

* cited by examiner

Figure 5:
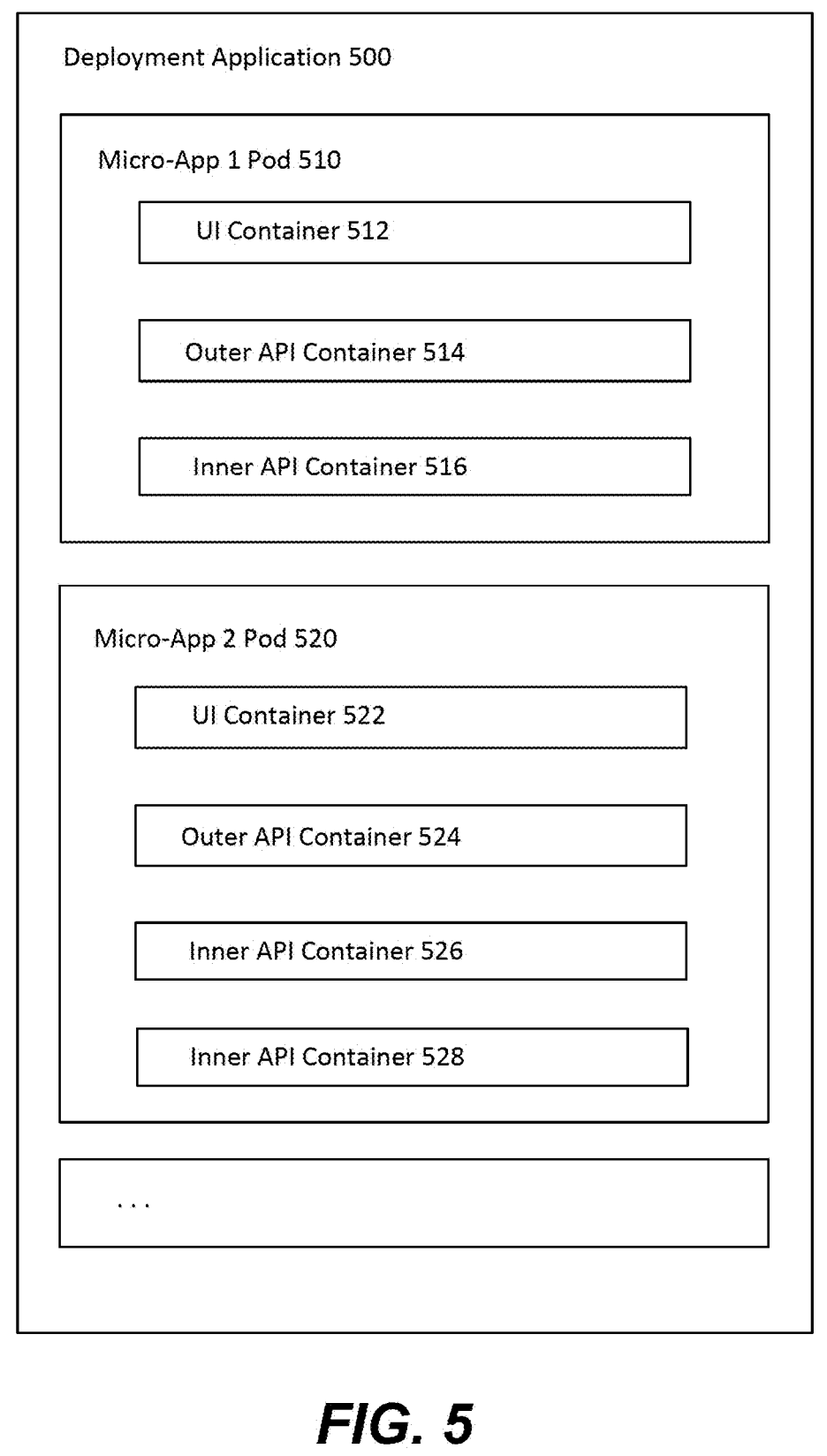

Deployment Application 500

Micro-App 1 Pod 510

UI Container 512

Outer API Container 514

Inner API Container 516

Micro-App 2 Pod 520

UI Container 522

Outer API Container 524

Inner API Container 526

Inner API Container 528

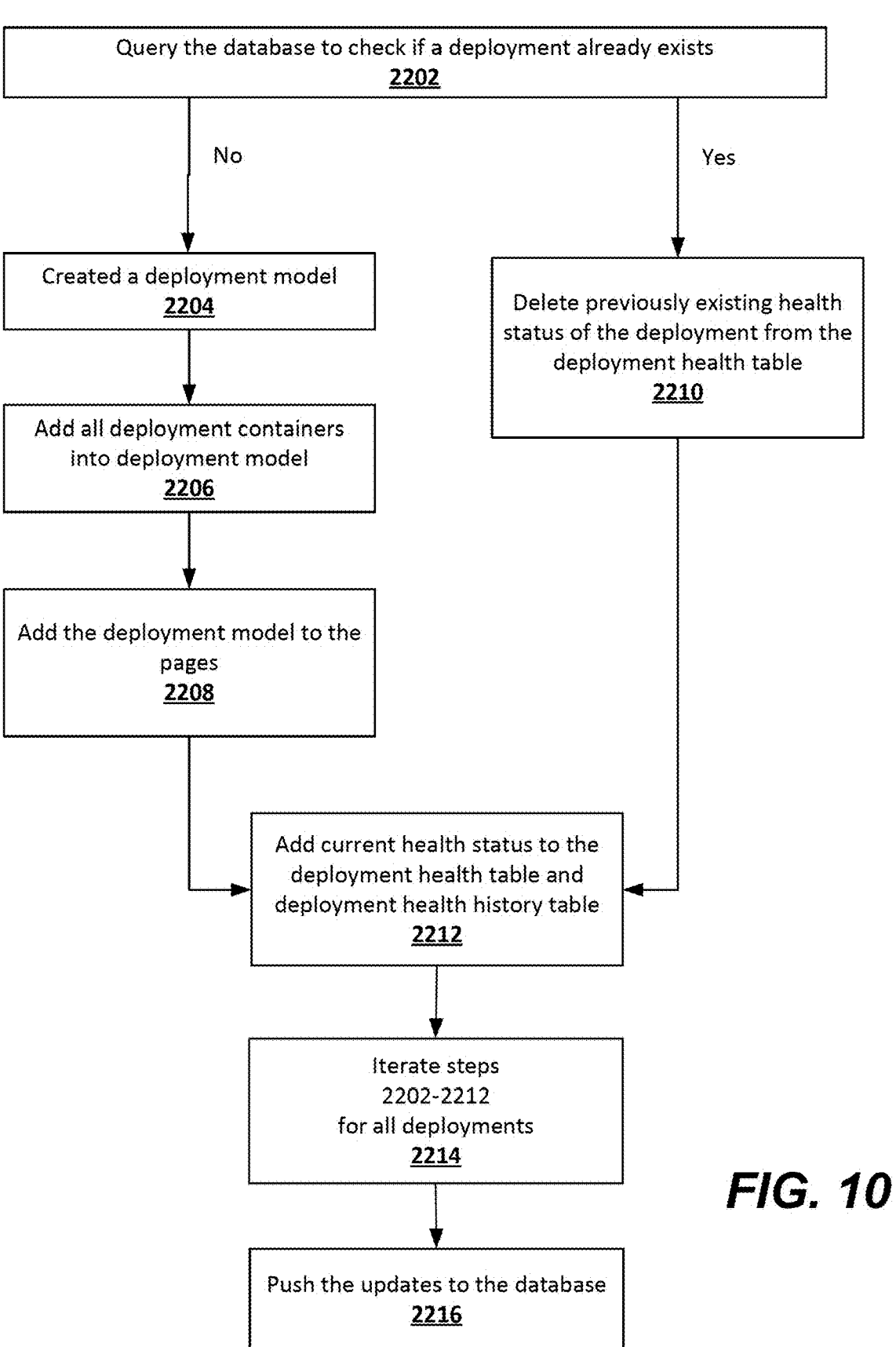

Query the database to check if a deployment already exists
2202

No

Yes

Created a deployment model
2204

Delete previously existing health status of the deployment from the deployment health table
2210

Add all deployment containers into deployment model
2206

Add the deployment model to the pages
2208

Add current health status to the deployment health table and deployment health history table
2212

Iterate steps
2202-2212
for all deployments
2214

Push the updates to the database
2216

*FIG. 10*

SYSTEMS AND METHODS FOR MONITORING HEALTH OF A DIGITAL APPLICATION SYSTEM

CROSS REFERENCE TO RELATED APPLICATION

This application is based upon and claims the benefit of prior U.S. Provisional Patent Application No. 63/562,792, filed on Mar. 8, 2024, the entire contents of which are incorporated herein by reference.

TECHNICAL FIELD

The present disclosure relates generally to systems and methods for monitoring the health and status of a digital application system. More specifically, and without limitation, the disclosed embodiments provide real-time health and status information on each of the components that serve digital applications.

BACKGROUND

Computerized devices usually execute code organized in applications. Applications have become ubiquitous throughout computers including servers, personal computers, mobile devices, wearables, and other computerized devices. Oftentimes, an individual, such as production support specialists, developers, business stakeholders, executive leadership, and system administrators, need to know the operational state of each component or certain components of a digital application system. In some cases, the operational state of a digital application system is referred to as the health of components or the health of the application system. Various tools exist to monitor application health and provide information or alerts. Current tools, however, are ineffective for monitoring the application health of digital application system having complex or complicated structures. For example, traditional tools are unable to effectively monitor application health, because the digital application's structure is obfuscated between multiple different files in a data repository. Additionally, alerts and messages regarding unhealthy digital application system are often lost in the mix of messages leaving the layers of application in different pages including parent pages and sub-pages. Therefore, using current tools, in-depth research is often required to identify issues in application health, and to identify any downstream systems that may be affected, adding significant troubleshooting time and leading to inefficiency in the system and its diagnostics.

What is needed are new and improved systems and techniques for addressing these and other drawbacks of existing health monitoring systems and for improved systems and methods for real-time impact analysis and diagnosis.

SUMMARY

In view of the foregoing, embodiments of the present disclosure provide computer-implemented systems for monitoring health of a digital application system. In some embodiments, a system for monitoring health of a digital application system may include a memory that stores instructions and at least one processor. The at least one processor may be configured to execute the stored instructions to provide a health user interface. The health user interface may be configured to display a plurality of pages of the digital application system. Each of the plurality of pages may include at least one deployment. The at least one deployment may be marked in the user interface responsive to health status. The at least one deployment may include a list of a plurality of pods. Each of the plurality of pods may include a plurality of containers with an option to display health information and monitoring results of each of the plurality of containers. A system for monitoring health of a digital application system may further include a health application programming interface (API) hosting a page update service, a deployment update service, and a deployment history purge service. The health API may be configured to link page structure information and deployment information to display on the health user interface. The page update process may be configured to update a plurality of pages based on a routelog run by a first scheduled period. The deployment update process may be configured to update deployment information from a deployment API through a deployment client by a second scheduled period. The deployment history purge process may be configured to delete one or more deployment entries older than a predetermined date by a third scheduled period.

According to a disclosed embodiment, the computer system may further include a schedule controller may be configured to determine the first scheduled period, the second scheduled period and the third scheduled period.

According to a disclosed embodiment, the scheduler controller may be configured to run at least one of the page update process, the deployment update process, and the deployment health history purge process at a predetermined interval.

According to a disclosed embodiment, each page of the plurality of pages may be configured to host at least one micro-application.

According to a disclosed embodiment, each micro-application may be configured to be hosted on at least one page of the plurality of pages.

According to a disclosed embodiment, the routelog may include page information including page attributes and a component structure.

According to a disclosed embodiment, the page attributes may identify at least one of: the plurality of pages as a parent page or a sub-page of another page.

According to a disclosed embodiment, the component structure may include the structure information of the hosted at least one micro-applications of each page of the plurality of pages.

According to a disclosed embodiment, the routelog may be generated based on a page index file, one or more page model files, and one or more component files associated with the digital application system.

According to a disclosed embodiment, the monitoring results of each container may include at least one of availability percentage, memory usage, CPU usage, outer metrics, response count, median response time, and $90^{th}$ percentile response time.

Embodiments of the present disclosure provide a computer-implemented method for monitoring health of a digital application system by at least one process. In some embodiments, a method for monitoring health of a digital application system may include displaying a plurality of pages by using a health user interface. Each of the plurality of pages may include at least one deployment, and the at least one deployment may be marked in the user interface responsive to health status. The at least one deployment may include a list of a plurality of pods. Each of the plurality of pods may include a plurality of containers with an option to display health information and monitoring results of each of the plurality of containers. The method for monitoring health of a digital application system may include hosting a page update process, a deployment update process, and a deployment health history purge process by using a health application programming interface (API). The health API may be configured to link page structure information and deployment information to display on the health user interface. The page update process may be configured to update a plurality of pages based on a routelog run by a first scheduled period. The deployment update process may be configured to update deployment information from a deployment API through a deployment client by a second scheduled period. The deployment health history purge process may be configured to delete one or more deployment entries older than a predetermined date by a third scheduled period.

Embodiments of the present disclosure provide computer-implemented operations for monitoring health of a digital application system by at least one process. In some embodiments, operations for monitoring health of a digital application system may include displaying a plurality of pages by using a health user interface. Each of the plurality of pages may include at least one deployment, and the at least one deployment may be marked in the user interface responsive to health status. The at least one deployment may include a list of a plurality of pods. Each of the plurality of pods may include a plurality of containers with an option to display health information and monitoring results of each of the plurality of containers. The operations for monitoring health of a digital application system may include hosting a page update process, a deployment update process, and a deployment health history purge process by using a health application programming interface (API). The health API may be configured to link page structure information and deployment information to display on the health user interface. The page update process may be configured to update a plurality of pages based on a routelog run by a first scheduled period. The deployment update process may be configured to update deployment information from a deployment API through a deployment client by a second scheduled period. The deployment health history purge process may be configured to delete one or more deployment entries older than a predetermined date by a third scheduled period.

Consistent with other disclosed embodiments, non-transitory computer-readable storage media may store program instructions, which are executed by at least one processing device and perform any of the methods described herein.

It is to be understood that the foregoing general description and the following detailed description are exemplary and explanatory only, and are not restrictive of the disclosed embodiments.

BRIEF DESCRIPTION OF DRAWINGS

The accompanying drawings, which include a part of this specification, illustrate several embodiments and, together with the description, serve to explain the principles and features of the disclosed embodiments. In the drawings:

FIG. 5 is a block diagram showing an exemplary deployment application consistent with disclosed embodiments.

FIG. 10 is a flowchart of an exemplary deployment update process, consistent with disclosed embodiments.

DETAILED DESCRIPTION

Reference will now be made in detail to exemplary embodiments, discussed with regards to the accompanying drawings. In some instances, the same reference numbers will be used throughout the drawings and the following description to refer to the same or like parts. Unless otherwise defined, technical and/or scientific terms have the meaning commonly understood by one of ordinary skill in the art. The disclosed embodiments are described in sufficient detail to enable those skilled in the art to practice the disclosed embodiments. It is to be understood that other embodiments may be utilized and that changes may be made without departing from the scope of the disclosed embodiments. For example, unless otherwise indicated, method steps disclosed in the figures may be rearranged, combined, or divided without departing from the envisioned embodiments. Similarly, additional steps may be added or steps may be removed without departing from the envisioned embodiments. Thus, the materials, methods, and examples are illustrative only and are not intended to be limiting.

Figure 1A:
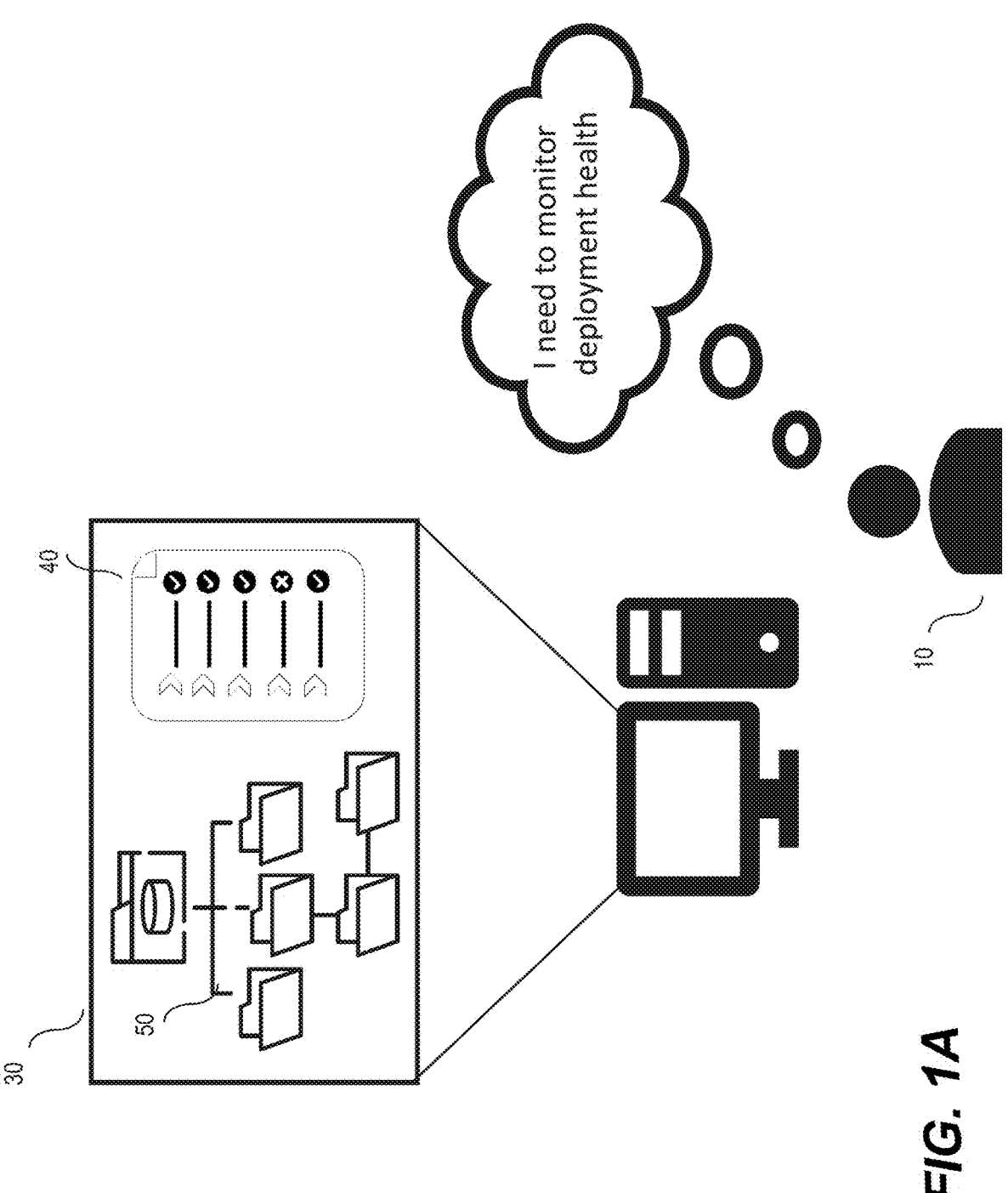
FIG. 1A is a diagram illustrating the need to monitor health of a digital application system.

FIG. 1A is a diagram illustrating individuals from different functional groups expressing the need to monitor the health of an application system 50. Application system 50 may be a computer software package that may help users perform specific tasks. For example, a digital banking system may help users perform specific tasks related to online banking, bill payment, and account management tools. Individual 10 may be a user of the application system, a system administrator, or a system developer, involved in the programming of the application system 50. Visualization 30 may be a display of the application, used for visualizing data. Visualization 30 may visualize data on a user device, such as a web interface of a computer, laptop, or mobile device, consistent with disclosed embodiments. Deployment monitoring system 40 may be a system to monitor the deployment process. The deployment process may refer to one or more processes that may be configured to make a system available for users. Individual 10 may monitor application system 50 through visualization 30 by expressing a desire to improve the deployment monitoring system 40 to provide better visualization and to develop an easier way to monitor the health information of components with the complicated structures of each page of the application. As shown in FIG. 1A, application system 50 does not have tools to monitor the health of the digital application system within the system. This conventional tool fails to effectively monitor application health, because the application's structure is obfuscated between multiple different files in a data repository, as illustrated in FIG. 1A. Additionally, alerts and messages concerning unhealthy digital application system shown as a cross in deployment monitoring system 40 are often lost in the mix of messages leaving the layers of application system 50 on different pages, including parent pages and sub-pages. As a result, utilizing current tools, in-depth research is often required to identify issues in application health and to identify any downstream systems that may be affected, adding significant troubleshooting time and leading to inefficiency in the system and its diagnostics. Therefore, there is a need for a solution that solves these issues with conventional solutions.

Figure 1B:
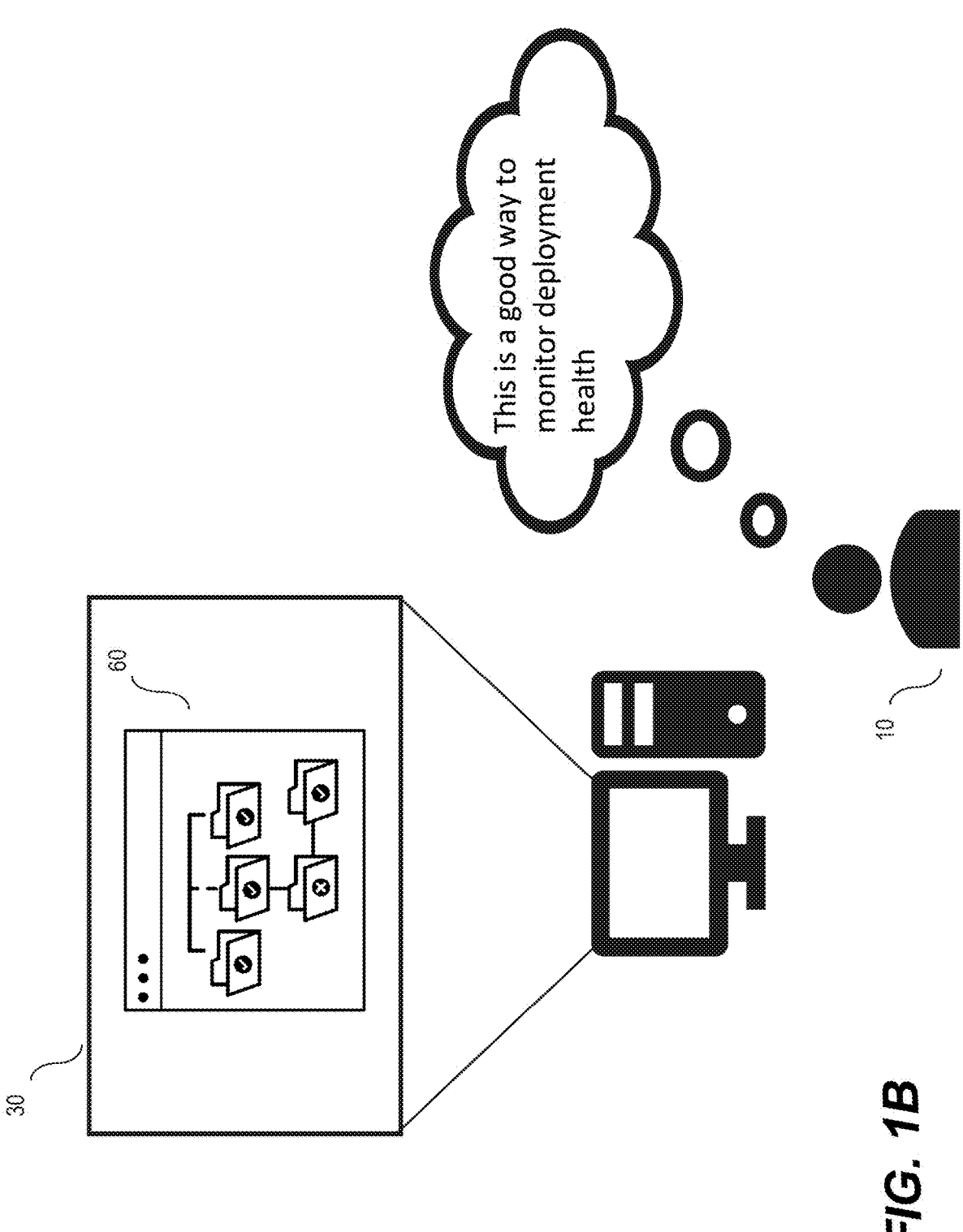
FIG. 1B is a diagram illustrating an exemplary solution to monitor health of a digital application system.

FIG. 1B illustrates an exemplary solution to monitor health of a digital application system. As illustrated in FIG. 1B, the enhanced monitoring application system 60 may refer to a monitoring system displaying the monitoring results that utilizes a contextualized approach. The contextualized approach may refer to a link between the application's structure information and the application's deployment information to exhibit monitoring results within the original complex file structure, as described herein. This approach may meet the needs of individual 10, and diverse teams and groups, who may all leverage the monitoring application 60 to view the current health and state of the application at a level of detail that fits each individual 10's interests and level of knowledge. It is to be understood that individual 10 is merely exemplary and multiple individuals may utilize the system. Similar to FIG. 1A, visualization 30 may be used to display the enhanced monitoring application system 60, as shown in FIG. 1B.

Figure 2:
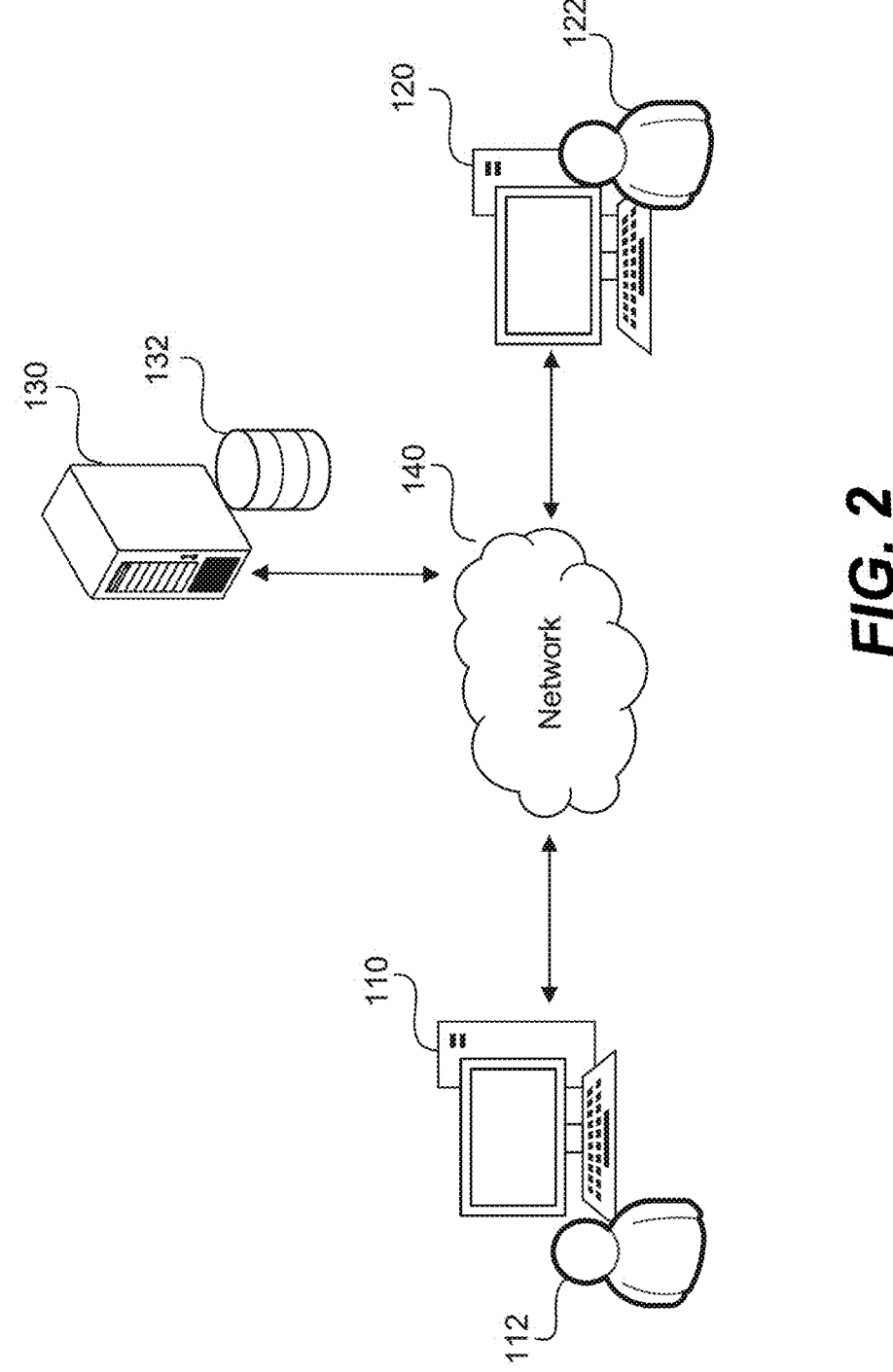
FIG. 2 is a diagram of an exemplary system for a digital application system, consistent with disclosed embodiments.

FIG. 2 is a diagram of an exemplary system 100 for a digital application system, consistent with disclosed embodiments. System 100 may include at least two endpoint devices 110 and 120, at least two users 112 and 122, one or more computing devices 130, one or more databases 132, and a network 140, as shown in FIG. 2.

The various components of system 100 may communicate over a network 140. Such communications may take place across various types of networks, such as the Internet, a wired Wide Area Network (WAN), a wired Local Area Network (LAN), a wireless WAN (e.g., WiMAX), a wireless LAN (e.g., IEEE 802.11, etc.), a mesh network, a mobile/cellular network, an enterprise or private data network, a storage area network, a virtual private network using a public network, a nearfield communications technique (e.g., Bluetooth, infrared, etc.), or various other types of network communications. In some embodiments, the communications may take place across two or more of these forms of networks and protocols. While system 100 is shown as a network-based environment, it is understood that in some embodiments, one or more aspects of the disclosed systems and methods may also be used in a localized system, with one or more of the components communicating directly with each other.

User endpoint devices 110, 120 may be configured such that a user 112 or 122 may access a navigation location through a browser or other software executing on user endpoint devices 110, 120. As used herein, a navigation location may be any network location deemed sensitive, e.g., a network location containing customer identification information. A navigation location may also refer to having one or more security protocols to authenticate a user trying to access the location. Activity of a user at the network location may be audited to provide increased accountability for the user. For example, a navigation location may include a particular URL (or URL domain, etc.), a network location internal to an organization, or any other sensitive network location. User endpoint devices 110, 120 may include any form of computer-based device or entity through which users 112, 122 may access a navigation location. For example, user endpoint devices 110, 120 may be a personal computer (e.g., a desktop or laptop computer), a mobile device (e.g., a mobile phone or tablet), a wearable device (e.g., a smart watch, smart jewelry, implantable device, fitness tracker, smart clothing, head-mounted display, etc.), an IoT device (e.g., smart home devices, industrial devices, etc.), or any other device that may be capable of accessing web pages or other network locations. In some embodiments, user endpoint devices 110, 120 may be a virtual machine (e.g., based on AWS™, Azure™, IBM Cloud™, etc.), container instance (e.g., Docker™ container, Java™ container, Windows Server™ container, etc.), or other virtualized instance. Using the disclosed methods, activity of user 122 through user endpoint device 120 may be monitored and recorded by a browser extension executing on user endpoint device 120.

User endpoint devices 110, 120 may communicate with computing device 130 through network 140. For example, user endpoint devices 110, 120 may receive a web link to enter health application 1300 (shown in FIG. 6B) and transmit data inputted by users 112, 122 to computing device 130. A health application may refer to a contextualized container health and status monitoring system, consistent with disclosed embodiments. The health and status monitoring system may refer to the deployment information and performance status. Alternatively, user endpoint devices 110, 120 may receive a web link to enter a health API 2000 (shown in FIG. 6B) to send a request to the computing device 130. The health API 2000 may be used to access the health application to collect the health information, consistent with disclosed embodiments. User endpoint devices 110, 120 may be configured to display the collected health information to users 112, 122 of the digital application system.

The term "health," "health application," or "health system" as used herein may refer to a contextualized approach that is monitoring the system's real-time health and status. The contextualized health system is a novel approach to monitor and display the health and status of deployment for each endpoint in a manner to be visualized in the format of the digital application system. This health system is designed to provide real-time insights into the performance of digital application system by leveraging the user interface (UI) code and container management system API. The health system is capable of monitoring various aspects of the digital application system's health and status, including deployment status, resource utilization, network traffic, and application performance, such as container availability, memory and CPU usage, service success rate, response count, and response time. By providing a comprehensive view of the digital application system's health and status in its contextualized format, the health system enables developers to quickly identify and resolve issues, thereby improving the overall user experience.

User endpoint devices 110, 120 may also authenticate an identity of users 112, 122 via a web link provided by computing device 130. Authentication may occur through verification of a user's credentials. For example, verification may include providing a user's requisite username and password through the web link. Associating users based on access rights may include any means to authenticate a user's identity to show proof of connection to an organization. For example, means of authentication may include token authentication, multi-factor authentication, password-based authentication, biometric-based authentication, facial recognition, or other similar authentication techniques. In some embodiments, user endpoint devices 110, 120 may include a DAS user interface 1000 (discussed with respect to FIG. 6A).

An endpoint is a term used in computer networking to refer to a device or a software application that acts as a communication source or destination in a network. Endpoints may be physical devices such as computers, servers, routers, switches, or mobile devices, or they may be software applications such as web browsers, email clients, or messaging apps. Endpoints may be included in a network to enable communication between different devices and applications.

Endpoints may be either client or server-based. A client endpoint may refer a device or application that initiates a communication request, while a server endpoint is a device or application that responds to the request. Endpoints may also be classified as internal or external, depending on whether they are located within the organization's network or outside of it. The security of endpoints may also be critical in network security as they are often targeted by cybercriminals. Endpoint security solutions may be used to protect endpoints from malware, viruses, and other cyber threats.

Computing device 130 may include any form of a remote computing device configured to receive, store, and transmit data. For example, computing device 130 may be a server configured to store files accessible through a network (e.g., a web server, application server, virtualized server, etc.). Computing device 130 may interact with a database 132, for example, a deployment database or a page database, to receive and/or store information. Database 132 may be included on a volatile or non-volatile, magnetic, semiconductor, tape, optical, removable, non-removable, or other type of storage device or tangible or non-transitory computer-readable medium. Database 132 may also be part of computing device 130 or separate from computing device 130. When database 132 is not part of computing device 130, computing device 130 may exchange data with database 132 via a communication link. Database 132 may include one or more memory devices that store data and instructions used to perform one or more features of the disclosed embodiments. Database 132 may include any suitable databases, ranging from small databases hosted on a workstation to large databases distributed among data centers. Database 132 may also include any combination of one or more databases controlled by memory controller devices (e.g., server(s), etc.) or software. For example, database 132 may include document management systems, Microsoft SQL™ databases, SharePoint™ databases, Oracle™ databases, Sybase™ databases, other relational databases, or non-relational databases, such as mongo and others. Although one database 132 is shown in FIG. 2, the system 100 may include one or more databases 132, which may be used to store various types of information associated with the digital application system.

Figure 3:
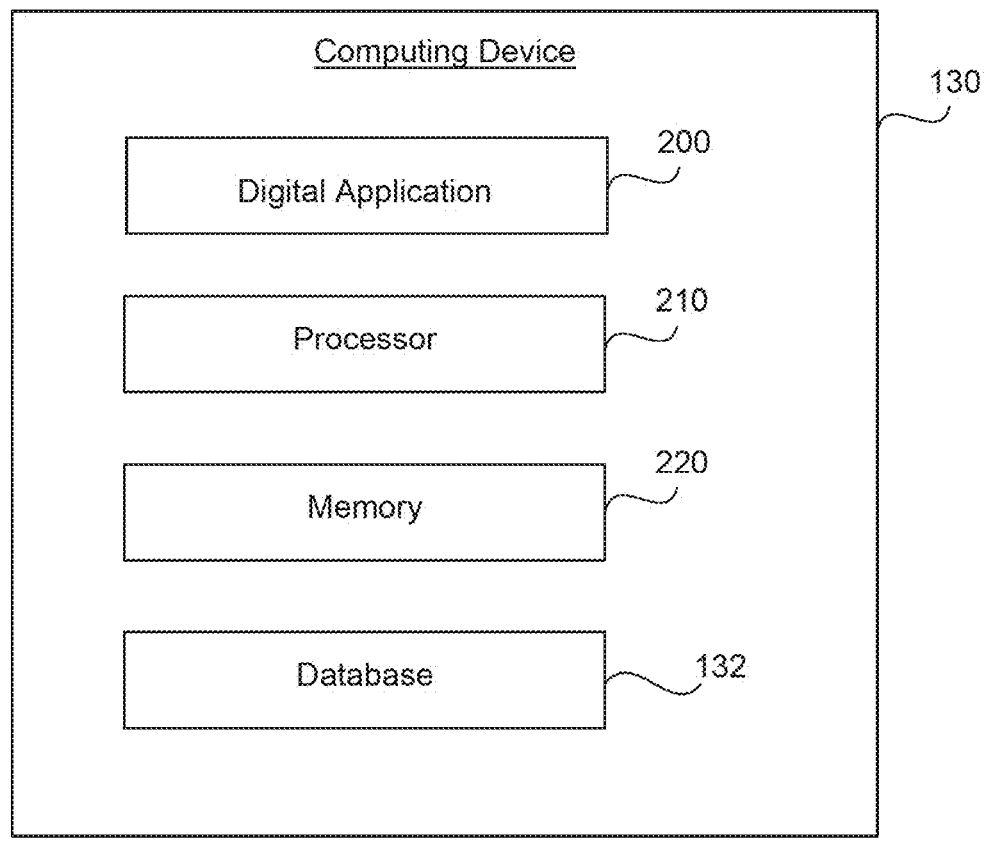
FIG. 3 is a block diagram showing an exemplary computing device, consistent with disclosed embodiments.

FIG. 3 is a block diagram showing an example computing device 130, consistent with disclosed embodiments. As described above, computing device 130 may be one or more devices configured to allow data to be received and/or transmitted by system 100 (e.g., a server, etc.) and may include one or more dedicated processors and/or memories. For example, computing device 130 may include a processor (or multiple processors) 210, and a memory (or multiple memories) 220, as shown in FIG. 3. Computing device 130 may include one or more digital and/or analog devices that may allow computing device 130 to communicate with other machines and devices, such as other components of system 100. Computing device 130 may include one or more input/output devices. Computing device 130 may include a screen for displaying communications to a user. In some embodiments computing device 130 may include a touch screen. Computing device 130 may also include one or more digital and/or analog devices that may allow a user to interact with system 100, such as touch-sensitive area, keyboard, buttons, or microphones.

In some embodiments, a digital application system, such as digital application system 200 may operate on one or more devices, such as 110 and/or 120 shown in FIG. 2, that may be configured to allow data to be received and/or transmitted by the system (e.g., computing device 130, etc.), and may include one or more dedicated processors and/or memories, such as processor 210 and memory 220 of FIG. 3, respectively. For example, a digital application system 200 may be executed by a processor, e.g., processor 210, (or multiple processors) and a memory, e.g., memory 220, (or multiple memories). Digital application system 200 may include one or more digital and/or analog devices that allow digital application system 200 to communicate with other machines and devices, such as other components of system 100. Digital application system 200 may include one or more input/output devices. In some embodiments, digital application system 220 may be a mobile application, which may be accessed through a mobile device such as a smartphone. Digital application system 200 may include a screen for displaying communications to a user. Digital application system 200 may also include one or more digital and/or analog devices that allow a user to interact with the system, such as touch-sensitive area, keyboard, buttons, or microphones.

Processor 210 may take the form of, but is not limited to, one or more integrated circuits (IC), including application-specific integrated circuit (ASIC), microchips, microcontrollers, microprocessors, embedded processor, all or part of a central processing unit (CPU), graphics processing unit (GPU), digital signal processor (DSP), field-programmable gate array (FPGA), server, virtual server, system on an chip (SOC) or other circuits suitable for executing instructions or performing logic operations. Furthermore, according to some embodiments, processor 210 may be from the family of processors manufactured by Intel®, AMD®, Qualcomm®, Apple®, NVIDIA®, or the like. The processor 210 may also be based on the ARM architecture, a mobile processor, or a graphics processing unit, etc. In some embodiments, processor 210 may be one of several processors in a distributed or cloud computing system. The disclosed embodiments are not limited to any type of processor configured in computing device 130. In some embodiments, processor 210 may be a special purpose processor config-
ured to perform one or more of the operations described
below.

Memory 220 may include one or more storage devices
configured to store instructions used by the processor 210 to
perform functions related to computing device 130. The
disclosed embodiments are not limited to particular software
programs or devices configured to perform dedicated tasks.
For example, memory 220 may store a single program, such
as a user-level application, that performs the functions
associated with the disclosed embodiments, or may include
multiple software programs. Additionally, processor 210
may, in some embodiments, execute one or more programs
(or portions thereof) remotely located from computing
device 130. Furthermore, memory 220 may include one or
more storage devices configured to store data for use by the
programs. Memory 220 may include, but is not limited to a
hard drive, a solid state drive, a CD-ROM drive, a peripheral
storage device (e.g., an external hard drive, a USB drive,
etc.), a network drive, a cloud storage device, or any other
storage device.

Figure 4:
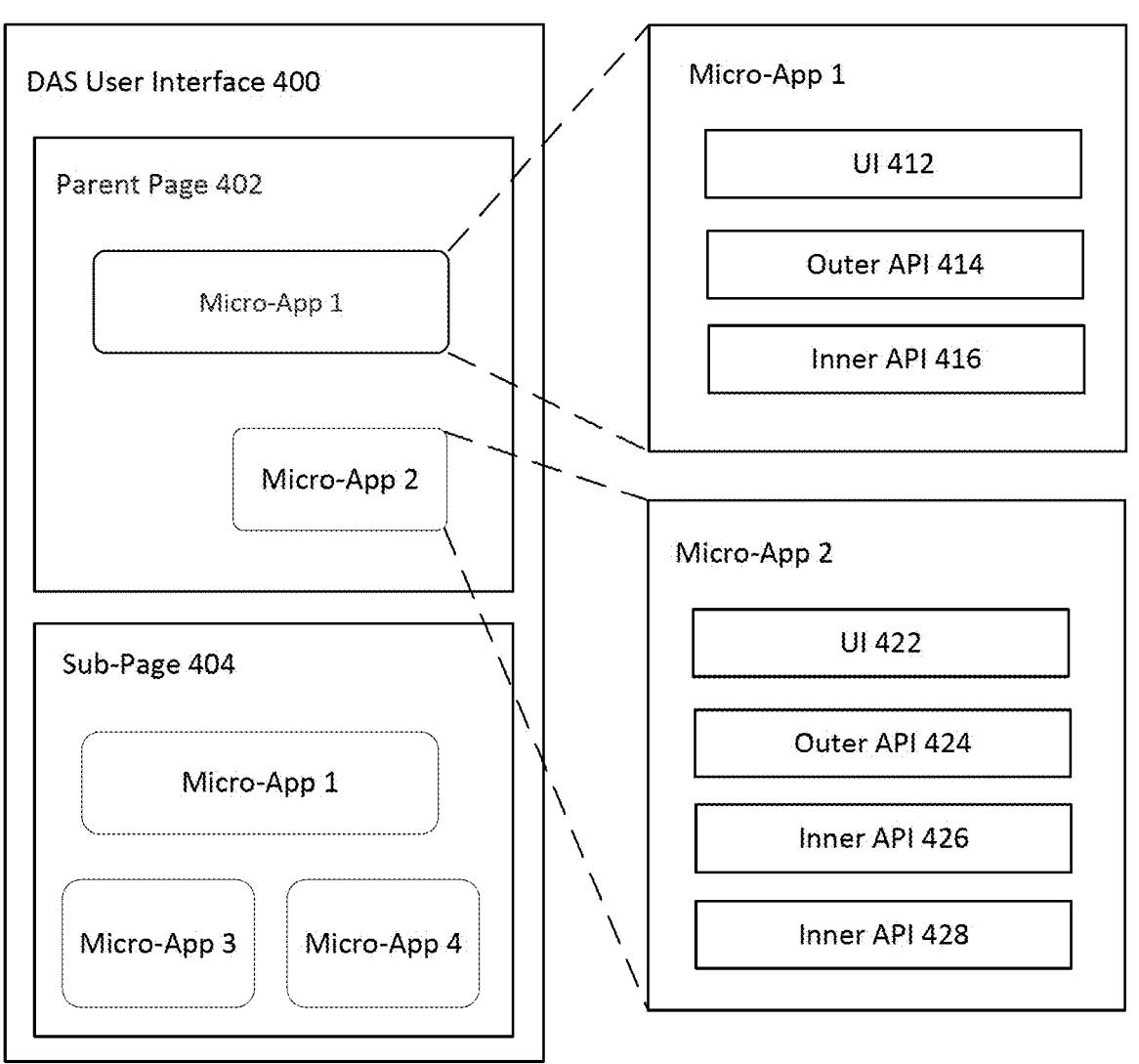
FIG. 4 is a block diagram showing an exemplary digital application system interface consistent with disclosed embodiments.

FIG. 4 is a block diagram showing an exemplary digital
application interface 400, consistent with disclosed embodi-
ments. Digital application system interface 400 may include
one or more pages 402 and one or more sub-pages 404.
Interface 400 may be designed to build functionality in
small, discrete pieces commonly referred to as "micro-
applications" or "Micro-Apps." Example of micro-applica-
tions may include Micro-App 1, Micro-App 2, Micro-App 3,
and Micro-App 4, as illustrated in FIG. 4. Pages may refer
to components configured to lay out one or more micro-
applications under a certain structure and route information
to and from the one or more micro-applications. It is to be
understood that page 402 is merely exemplary and there may
be a plurality of pages within interface 400. In some
embodiments, page 402 may hold Micro-App 1, Micro-App
2, and Micro-App 3. Consistent with disclosed embodi-
ments, each page 402 may be configured to host at least one
micro-application. It is to be understood that page 402 may
hold just one Micro-App or any combination of Micro-Apps
and that the depiction of holding Micro-App 1, Micro-App
2, and Micro-App 3 is merely exemplary. In some embodi-
ments, one micro-application may be included in more than
one page. In some embodiments, one micro-application may
be hosted on at least one page of the plurality of pages. In
some embodiments, page 402 may include one or more
sub-pages 404. Subpages 404 may be subordinate to a higher
page, for example, page 402, and have a child-to-parent
relationship with page 404 in interface 400. It is to be
understood that subpages 404 may be merely exemplary and
there may be a plurality of subpages within page 402.

A "parent page" may refer to a main page that is posi-
tioned at the top of a hierarchy or category; while a "child
page" or "subpage" may refer to a subpage that lies under
the main page within that hierarchy. Subpages 404, as a type
of page, may be configured to hold one or more micro-
applications under a layout or positional structure defined by
the developer of the digital application system (DAS). The
layout of pages and the micro-applications held within pages
may be determined by a network of typescript component
files in the digital application system's UI code. Every page
in the DAS may be defined by a component file, and each
component file references one or more UI bundles, which
may be correlated 1-1 with a micro-application. A UI bundle
may refer to a directory that contains one or more UIs for the
page or subpage. The layout may be further determined in
combination between the typescript driving the page and the HTML template defining where each microapp is placed
within the page. The layout of subpage 404 or any one or
more pages may be determined by component files in the
user interface code of interface 400. These component files
may be building blocks that define the structure of pages.
These UI bundles may also be correlated to the micro-
applications that are placed within the subpage. In some
embodiments, one micro-application, e.g., Micro-App 1,
may be included in both page 402 and sub-page 404.

Reference will now be made to certain terminology used
throughout the application. Micro-applications may include
various blocks or components, including a user interface,
one or more outer Application Programming Interfaces
(API), and one or more inner APIs, which enable developers
to work independently on separate features and functions,
fostering greater flexibility and parallel development. The
detailed blocks and components of micro-applications may
serve to further enrich the development process, because
these components allow developers to concentrate on spe-
cific facets of the application. Front-end blocks, for instance,
may be devoted to the user interface and user experience
elements of the micro-application, while back-end blocks
may handle server-side logic, data processing, and business
rules. Communication blocks, on the other hand, may over-
see communication with central data repositories or external
services. Each block, for example, may encapsulate code,
runtime, systems tools, libraries, and settings. These self-
contained units may operate independently and may also be
combined with other blocks to construct more intricate
systems, such as a web banking application system.

Certain micro-application blocks may be exclusive to a
specific micro-application, tailored to its unique needs and
functions, for example, satisfying different business func-
tions relating to a user's bank account. In some embodi-
ments, other micro-application blocks may be shared across
multiple micro-applications, promoting code reuse and con-
sistency throughout the system. Each micro-application may
be focused on a particular task/business function or set of
tasks/business functions, making it modular and easily man-
ageable. Each micro-application may be modular for a
particular task or business function, which may make it easy
to perform manageable functions including installing, updat-
ing, and adjusting. Using the micro-application blocks in
lieu of writing the codes for each function may reduce
redundancy and facilitate maintenance, resulting in a
streamlined and efficient system. For instance, a digital
application system including various micro-applications,
such as user account management, transaction processing,
and customer support, may have front-end and back-end
blocks for managing user data, transaction processing, and
support ticket management. A user account management
may refer to a micro-application that may be able to manage
the user's account. For example, a user's bank account may
include a user account Management to manage a user's
account information, such as log on data and contract
information. Transaction processing may refer to a micro-
application that may be able to process transactions. Cus-
tomer support may refer to a micro-application that may be
able to support the customers, including, providing technical
support, answering questions about products or services,
resolving complaints, and offering guidance on how to use
a product or service. In some embodiments, some micro-
application blocks, such as authentication and user profile
management, may be shared across all three micro-applica-
tions. The shared micro-application blocks may ensure a
consistent user experience and simplifies the overall system
architecture. It is to be understood that this example is merely exemplary, and there is no limit to the number of micro-applications that may be used across a system.

Referring to FIG. 4, an example Micro-App 1 may include user interface (UI) 412, outer API 414, and inner API 416. In another example, Micro-App 2 may include UI 422, outer API 424, inner API 426, and inner API 428.

In some embodiments, UI 412 and UI 422, may be exemplary front-end interfaces and may be devoted to the user experience elements of the micro-application. The front-end interface of a micro-application may refer to the user-facing part of the application system described herein. In some embodiments, the front-end interface may be a user interface. The front-end interface may be designed to interact directly with users, presenting information and receiving inputs. For example, in some embodiments, the front-end interface may receive a first digital information from a user and display a second digital information to the user through a micro-user interface (micro-UI). As used herein, the first digital information may refer to the initial data or input provided by the user. For example, the first digital information may be a user entering search queries, filling out forms, or providing any other type of input. The second digital information may refer to the output or data presented back to the user based on the first digital information. For example, after processing a search query, the front-end interface may display the search results, or show confirmation messages after a form is submitted. In some other embodiments, exchange of digital information (e.g., first and/or second digital information) may be performed through other forms of user interaction (e.g., command-line interface, voice-user interface, biometric interface, Natural language Processing (NLP), or multi-modal interfaces). One purpose of the front-end interface may be to provide a user-friendly experience, allowing users to interact with and manipulate digital information in a way that is intuitive and accessible. The intuitive and accessible nature of the interface may be achieved by providing a visual display through the front-end interface of the user's entered information and the output results.

In some embodiments, each micro-application of the plurality of micro-applications may include an outer Application Programming Interface (API), such as outer API 414 and outer API 424, as shown in FIG. 4. Outer APIs may refer to interfaces utilized for digital application system, micro-applications, or exposed to third parties. Outer APIs may serve as the bridge between the front-end and the back-end systems. Outer APIs may be tightly coupled with the front-end interface and be unique to each micro-application (e.g., user experience within the channel application). Outer APIs may be documented in a developer platform for developing digital experience applications. Such a platform may provide developers with a common user interface framework enabling the development of consistent and standard digital experience applications. In addition, a developer platform may provide developers with the toolkit, components, and libraries to ensure proper automated testing, debug and build patterns, and ensure that applications are built to architecturally approved standards.

In some embodiments, the outer API may transfer the first digital information received from the user via the front-end interface to a database and retrieve the second digital information for display to the user from the database by orchestrating calls to at least one inner API deployed on the server. In other words, outer APIs may play a role in data transfer between front-end and back-end components within the server. For example, when a user interacts with the front-end interface of a micro-application within the channel application, providing input such as a search query or form submission (first digital information), the outer API may capture this input and transfer it to the back-end systems, specifically to a database, by making orchestrated calls to the inner APIs. The inner APIs may process the input, perform necessary computations or data retrieval, and store or retrieve the relevant data from the database (second digital information). For example, relevant data may be determined and selected in response to a query (e.g., query included in the first digital information). The outer API may then retrieve the processed data and present it back to the user through the front-end interface, completing the interaction cycle.

In some embodiments, the outer API may be further configured to process the retrieved second digital information. As used herein, processing retrieved digital information may refer to a series of operations performed on the data received from back-end systems (e.g., by invoking at least one inner API) to ensure the data is ready for presentation and interaction on the front-end interface. For example, in some embodiments, processing the retrieved second digital information may include filtering the retrieved second digital information to match requirements of the front-end interface. This filtering process may involve tailoring the data retrieved from back-end services to match the specific requirements and constraints of the user interface. In some embodiments, the requirements of the front-end interface may be based on at least one of the channel application or the user device. For instance, a mobile application might require different data or a different subset of information compared to a desktop application. Outer APIs may ensure that only the relevant data is passed on to the front-end interface, optimizing performance and user experience. In some other embodiments, processing the retrieved second digital information may include converting a data format of the retrieved second digital information into a structure that is optimized for use by the front-end interface. For example, the inner APIs may return data in a standard JSON format. This data might not be directly usable by the front-end interface due to differences in structure or required content. Outer APIs may perform the necessary transformations, reformatting the JSON data into a structure that aligns with the needs of the micro front-end components, i.e., a format that is easily consumed by the front-end interface. This transformation may ensure that the front-end interface may efficiently render and interact with the data without additional processing.

Inner APIs, such as inner API 416, inner API 426, and inner API 428 as shown in FIG. 4, may refer to specialized interfaces designed specifically for backend systems within a micro-application architecture. The inner APIs may serve as a layer of abstraction that facilitates communication and interaction between the micro-application's front-end and its backend systems. By using inner APIs, micro-applications may achieve loose coupling, meaning they are less dependent on the specific implementation details of the backend systems they interact with. In some embodiments, inner APIs may adhere to a specific model. For instance, in the context of a digital banking platform, inner APIs might follow the BIAN (Banking Industry Architecture Network) API Model and utilize the BIAN Object Model (BOM). The BIAN API Model provides standardized guidelines and protocols for defining APIs in the banking domain, ensuring consistency, interoperability, and scalability across different banking services and applications. The BIAN Object Model (BOM) defines a standardized approach to representing banking domain objects and their relationships, enhancing data consistency and compatibility within the micro-application ecosystem.

FIG. 5 is a block diagram showing an exemplary deployment application 500, consistent with the disclosed embodiments. An additional layer of abstraction may be added to manage micro-applications and deploy them, making them available for use. This layer, known as a "pod," represents the smallest unit of deployment. In some embodiments, a pod may be a unit of deployment for a deployment system and a deployment API. As shown in FIG. 5, in this deployment application 500, all containerized components within a deployment unit, e.g., a micro-application, are deployed/bundled together within a single pod. Exemplary Micro-App 1 as described with respect to FIG. 4 may be deployed on deployment application 500 in FIG. 5 within a single pod, Micro-App 1 Pod 510. Similarly, Micro-App 2 as described with respect to FIG. 4, may be deployed within a single pod, Micro-App 2 Pod 520 in FIG. 5.

In some embodiments, a pod (e.g., micro-app 1 pod 510, 520) may be a wrapper that includes one or more containers (e.g., UI container 512, 522, outer API container 514, 524, inner API container 516, 526, 528) that store specific metadata and provide a standard interface to interact with the containers (e.g., UI container 512, 522, outer API container 514, 524, inner API container 516, 526, 528) hosted by the pod (e.g., Micro-App 1 Pod 510, 520). A digital application system may include a network of containers. UI container 512, 522 may be a container that includes a front-end application that may generate or control the user interface that appears within the bounds of the micro-application in the page. Outer API container 514, 524 may be a container that includes a communication application that may take requests from the UI, requests information from the inner APIs, and may reformat the data to return to the UI and update the view. One or more inner API containers 516, 526, 528 may be containers for the inner APIs, which may process requests, perform necessary computations or data retrieval from the database, and may return data to the outer APIs. In some embodiments, each deployment in the digital application system may contain one UI container, one outer API container, and one or more inner API containers. In some embodiments, the front-end interface, the outer API, and the at least one inner API may be packaged in separate containers within deployment application.

Exemplary Micro-App 1 as described with respect to FIG. 4, may include UI 412, outer API 414, and inner API 416 and may be deployed as Micro-App 1 Pod 510, as further illustrated in FIG. 5. UI 412, outer API 414, and inner API 416 as described with respect to FIG. 4, may be deployed and included in Micro-App 1 Pod 510 as UI Container 512, outer API Container 514, and inner API Container 516, respectively, as illustrated in FIG. 5. Similarly, exemplary Micro-App 2 as described with respect to FIG. 4, which may include UI 422, outer API 424, inner API 426, and inner API 428, may be deployed as Micro-App 2 Pod 520, as illustrated in FIG. 5. UI 422, outer API 424, inner API 426, and inner API 428 as described with respect to FIG. 4 may be deployed and included in Micro-App 2 Pod 520 as UI Container 522, Outer API Container 524, Inner API Containers 526, and Inner API Containers 528, respectively, as illustrated in FIG. 5. A single pod, such as Micro-App 1 Pod 510, may be configured to isolate and enable exchange of the first and second digital information between the front-end UI container 512, the outer API container 514 and at least one inner API container 516.

Containers may enable the packaging and isolation (also referred to as containerization) of applications or micro-applications along with their complete runtime environment, encompassing all the necessary files for execution. The use of containers may facilitate the movement of applications across various environments, such as development, testing, and production, while preserving their full functionality. The deployment of containerized applications may help mitigate conflicts between development and operations teams by separating their respective responsibilities.

In some embodiments, each separate container (UI containers 512, 522, outer API containers 514, 524, inner API containers 516, 526, and 528) may include a respective port for exchanging digital information. In some embodiments, containers often need to communicate with each other or with external systems. In this context, ports may refer to communication endpoints that allow containers to exchange digital information (e.g., first and second digital information). Each container may be configured to expose one or more ports to facilitate communication with other containers, services, or external clients. By exposing ports, containers may listen for incoming network requests and send out responses or requests. Ports may be labelled using numbers, for example, a container may expose a Port 8080 for RESTful API requests. A port 8080 may be used as a proxy and caching port for hosting web servers.

Figure 6A:
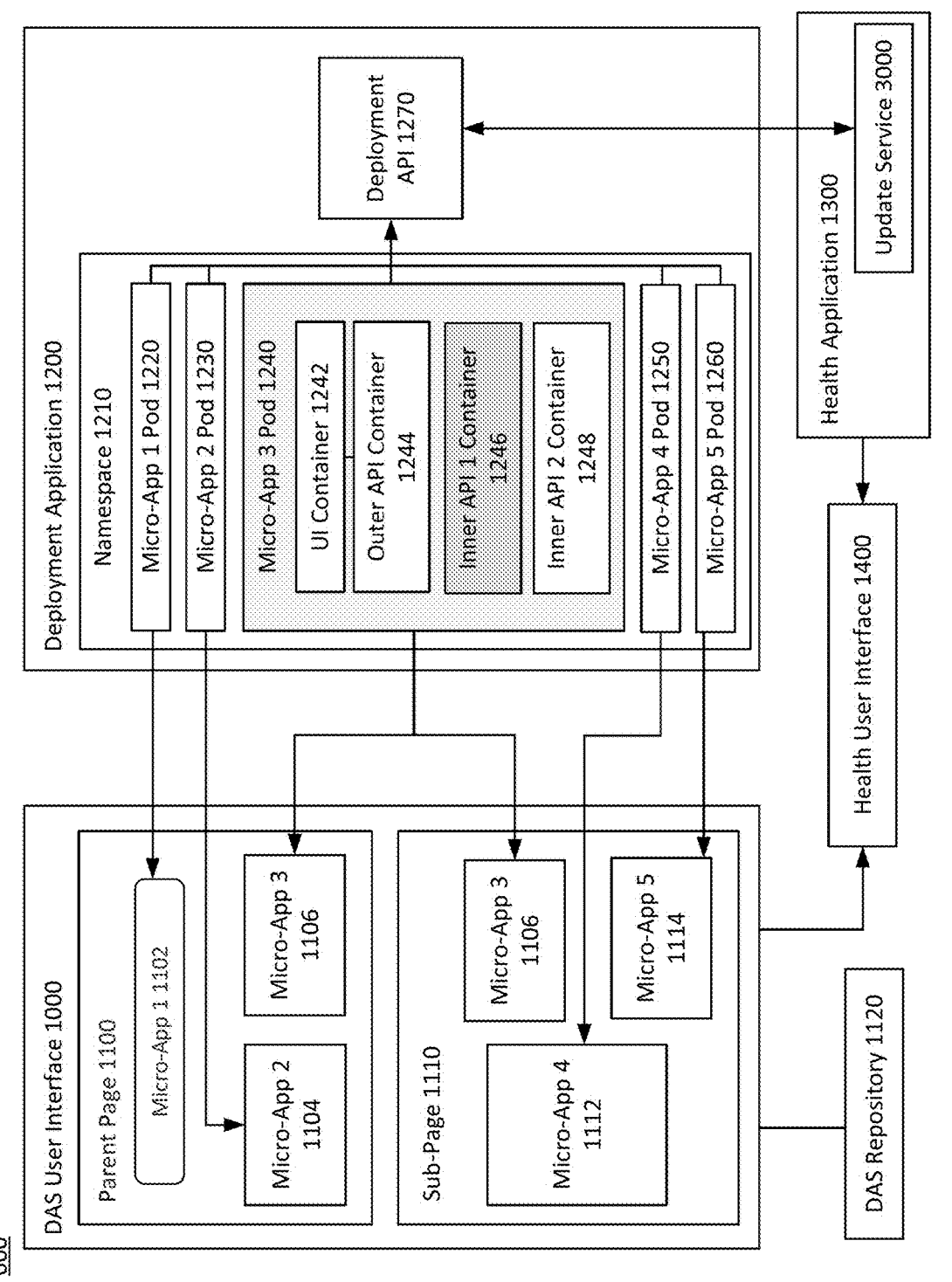
FIG. 6A is a first part of a diagram of an exemplary system for monitoring health of a digital application system, consistent with disclosed embodiments.
Figure 6B:
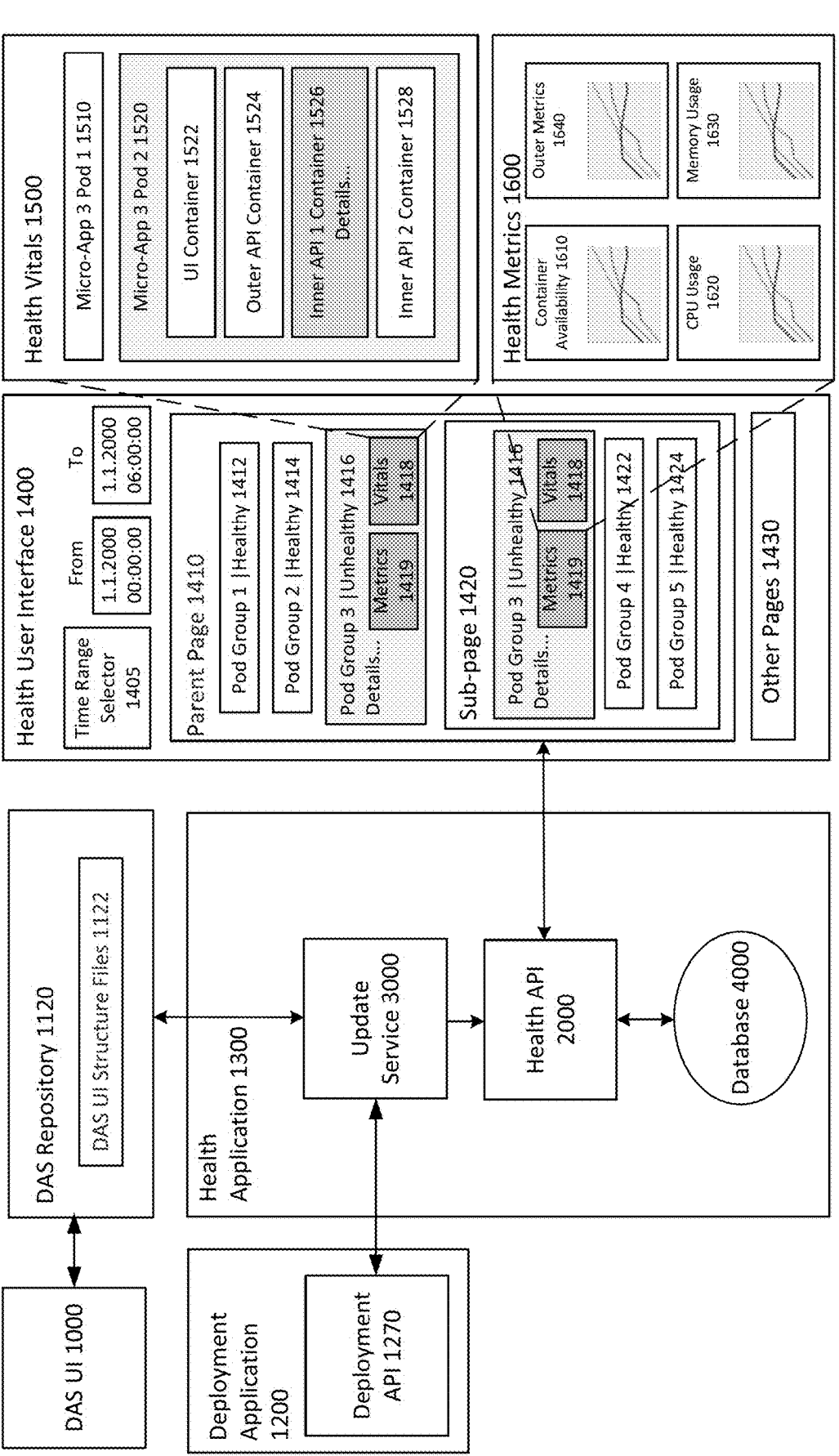
FIG. 6B is a second part of the diagram of an exemplary system for monitoring health of a digital application system, consistent with disclosed embodiments.

FIGS. 6A and 6B illustrate an exemplary health system for monitoring and displaying health and status of a digital application system, consistent with disclosed embodiments. As illustrated in FIGS. 6A and 6B, the system may include DAS user interface 1000, DAS repository, 1120, deployment application 1200, deployment API 1270, health application 1300, and health user interface 1400. Each of these components may contain further components, as described herein.

As illustrated in FIG. 6A, DAS user interface 1000 may be a part of a digital application system 600 may include one or more parent pages 1100 and one or more sub-pages 1110. DAS user interface 1000 may be configured in various ways. In some embodiments, DAS user interface 1000 may be provided in the form of a web browser capable of accessing and interacting with web pages and web applications on the Internet. In some embodiments, DAS user interface 1000 may be provided in an application that is web-enabled or not web-enabled. In some embodiments, DAS user interface 1000 may be a driver application's UI that hosts one or more micro-applications. A driver application may refer to a software platform designed to host and manage multiple micro-applications. In some embodiments, the digital application system's driver UI may be a separate deployment that may serve the structure of the digital application system. The driver UI may define the general structure of each page and micro-applications will be delivered on each page accordingly. DAS user interface 1000 as shown in FIG. 6A may be a different exemplary embodiment from DAS user interface 400 as illustrated in FIG. 4. For example, DAS user interface 1000 may include different micro-applications (e.g., Micro-App 5) from the micro-applications that may be included in DAS user interface 400 as illustrated in FIG. 4.

Each of parent pages 1100 and sub-pages 1110 may include one or more different micro-applications, as illustrated in FIG. 6A. Additionally, one type of micro-application may appear on multiple pages of the digital application system. Consistent with disclosed embodiments, parent page 1100 may include micro-app 1 1102, micro-app 2 1104, and micro-app 3 1106, while sub-page 1110 may include micro-app 3 1106, micro-app 4 1112, and micro-app 5 1114. In some embodiments, micro-app 3 1106 may appear on both parent page 1100 and sub-page 1110 within DAS user interface 1000. It is to be understood that this illustrated configuration is merely exemplary and any combination of parent pages, sub-pages and micro-applications may be configured.

DAS repository 1120 may be a data structure that stores information, including metadata for a plurality of pages, including parent pages and sub-pages. DAS repository 1120 may include storage locations for software development, including code, documentation, tests, scripts, and files. Repositories may allow management and organization of software projects, including deployed software and software in development. Repositories may include folders, directories, or data structures storing version information, metadata, source code, or code archives. Repositories may contain or track changes to a codebase, such as by keeping record of additions, deletions, or modifications to code for a program. For example, repositories may store different versions of a program. In some embodiments, a repository may include branches for various copies or various versions of the programs it contains. In some embodiments, repositories may be remote, such as repositories stored in a cloud server, or local, such as repositories stored on the same system or network as the corresponding application. For example, repositories may include GITHUB, BITBUCKET, GITLAB, ASSEMBLA, SOURCEFORGE, and LAUNCHPAD. Repositories may include different types of repositories or repositories configured to contain different types of information.

DAS repository 1120 may be configured to store code structure defining aspects of DAS user interface 1000. DAS repository 1120 may contain various types of information, such as buttons, menus, the layout, functionality, and design of the interface. DAS repository 1120 may be configured to provide a secure and organized way to store and access information. DAS repository 1120 may be part of the infrastructure that may be drawn from to generate DAS user interface 1000. DAS repository 1120 may be updated by pulling the information directly from the deployed code on a scheduled period. The scheduled period may occur one or more times hourly, daily, weekly, or monthly.

Consistent with disclosed embodiments, DAS repository 1120 may include a deployment repository. The deployment repository may refer to a repository for storing or managing artifacts and configuration files for deploying software. The deployment repository may store configuration files, templates, binaries, or metadata. For example, the deployment repository may store software service templates that are ready for deployment.

As shown in FIG. 6A, deployment application 1200 may refer to an application, which may be utilized for software deployment, scaling, and management. Deployment application 1200 may include deployment API 1270 and one or more namespaces 1210 for grouping and structuring the micro-applications. Deployment may refer to a technical process that focuses on the infrastructure and technical aspects of getting the software up and running. Deployment may refer to the act of moving code or software from a development environment to a test, staging, or production environment, where it ultimately becomes accessible to end-users. In some embodiments, a deployment application may create or modify instances of the pods that hold a containerized application. Deployments may help to efficiently scale the number of replica pods, enable the rollout of updated code in a controlled manner, or roll back to an earlier deployment version if necessary. Consistent with disclosed embodiments, a deployment application may provide declarative updates for pods and replicas. The replicas may refer to clones for pods. Replicas may ensure consistent and uninterrupted application performance. Deploying multiple pod replicas, for example, can mitigate the possibility of a single pod failing, ensuring the application's seamless availability without any downtime. A user may define deployments to create new replicas, or to remove existing deployments and adopt all their resources with new deployments.

Deployment API 1270 may be an application that may provide deployment functionality through an interface and store the state of the cluster. Deployment resources and records, such as application packages and configuration files, may all be stored as deployment API objects and may be modified via calls to the API. Users may interact with the deployment API directly. Users may interact with the deployment API via tools or extensions, such as update service 3000. Update service 3000 may refer to a service to obtain and combine data from two separate data sources: deployment API 1270 and DAS repository 1122 of DAS user interface 1000. Deployment API 1270 may include resources that allow fine grained authorization, such as separate views for pod details and log retrievals and may accept and display those resources in different representations for convenience or efficiency. Fine-grained authorization for APIs may allow for detailed control over who can access resources within an application.

Namespace 1210 may be a virtual cluster for organizing and structuring deployment objects to ensure smooth operations and project management. A namespace may help group and structure other deployment objects and partition them in a deployment cluster. This concept may allow a user to organize or isolate the deployment resources in a box-like form according to their purpose across multiple users and projects in a cluster. A namespace may have characteristics to provide a scope of names of resources, e.g., pods, services, replication controllers, and other elements as described here. In some embodiments, namespaces may not be nested inside one another, and each resource may only be in one namespace. In some embodiments, a deployment object may only be in one namespace.

In some embodiments, namespace 1210 for grouping the pods of micro-applications may include micro-app 1 pod 1220, micro-app 2 pod 1230, micro-app 3 pod 1240, micro-app 4 pod 1250, and micro-app 5 pod 1260. A pod of the deployment application may host multiple containers. Each container may generate a large number of logs. Deployment application 1200 may call for the structure of each deployment in DAS user interface 1000. The health and status information may be unique for each single container and each pod. As illustrated in FIG. 6A, micro-app 3 pod 1240 may include one UI container 1242, one outer API container 1244, one or more inner API containers, inner API 1 container 1246, and inner API 2 container 1248.

Consistent with disclosed embodiments, UI container 1242 may be a container that includes a front-end application that may generate or control the user interface that appears within the bounds of the micro-application in the page. Outer API container 1244 may be a container that includes a communication application that may take requests from the UI, requests information from the inner APIs, and optionally may reformat the data to return to the UI and update the view. One or more inner API containers 1246 and 1248 may be containers for the inner APIs, which may process requests, perform necessary computations or data retrieval from the database, and return data to the outer APIs.

For example, computation may be determined and selected in response to a query (e.g., query included in the first digital information).

In some embodiments, any endpoint containing an unhealthy replica within a page or a sub-page may be marked with a red exclamation point or any pattern and/or color to provide an immediately recognizable visual distinction from healthy pod groups and containers. In some embodiments, as shown in FIG. 6A, the deployment of micro-app 3 pod 1240 and inner API 1 container 1246 of deployment application 1200 may be shown in light shading and dark shading, respectively, to represent unhealthy status. The light and dark shading may be replaced by any pattern and/or color to provide an immediately-recognizable visual distinction from the healthy pod groups and containers.

FIG. 6B illustrates a second part of diagram of an exemplary system for monitoring health of a digital application system, consistent with disclosed embodiments. FIG. 6B incorporates elements of FIG. 6A as described herein. DAS repository 1120, as illustrated with respect to FIG. 6A, may serve as a data structure that stores information, including metadata for a plurality of pages, including parent pages and sub-pages. In some embodiments, DAS repository 1120 may store one or more DAS user interface (UI) structure files 1122. DAS UI structure files 1122 refer to one or more files that define the layout and structure of a page or application. For example, DAS UI structure files 1122 may store information for a driver application containing micro-applications. These files typically include HTML, CSS, and JavaScript code that determine how the content is displayed and how users interact with it. DAS UI structure files 1122 may provide a foundation for the visual design and functionality of the page or application, for creating a user-friendly and engaging experience.

As shown in FIG. 6B, health application 1300 may be a contextualized container monitor system. Health application 1300 may include health user interface 1400, health API 2000, update service 3000, and database 4000. Health user interface 1400 may be a user interface for the system described herein Health user interface 1400 may be configured to display a plurality of pages, e.g., parent page 1410, sub-page 1420, and other pages 1430, as shown in FIG. 6B. The plurality of pages may include at least one deployment pod group 1, pod group 2, and pod group 3, etc. The at least one deployment, e.g., pod group 1, pod group 2, pod group 3, etc., may be marked in the user interface with corresponding health statuses healthy 1412, healthy 1414, unhealthy 1416, etc., provided by deployment API 1270. In some embodiments, at least one deployment may include a list of a plurality of pods, micro-app 3 pod 1 1510, micro-app 3 pod 2 1520, etc. Micro-app 3 pod 1 1510 and micro-app 3 pod 2 1520 may be identical in everything but name, and possibly hosting location. If two users load the same page that contains "micro-app 3," one user's response may come from micro-app 3 pod 1 1510, and the other's response may come from micro-app 3 pod 2 1520, depending on internal load balancing. In some embodiments, each of the plurality of pods may include a plurality of containers, e.g., UI container 1522, outer API container 1524, inner API 1 container 1526, and inner API 2 container 1528, as shown in FIG. 6B. The plurality of containers may provide an option to display health information and monitoring the results of each of the plurality of containers.

In some embodiments, health application 1300 may update information through update service 3000 from two separate data sources: deployment API 1270 and DAS UI structure files 1122 of DAS repository 1120. In some embodiments, database 4000 may include page data, deployment data, deployment health data, and deployment health history data. Database 4000 may be similar or different from exemplary databases discussed herein.

Health user interface 1400 may allow users to freely switch between each cluster of digital application system. Health user interface 1400 may include a variety of filtering options, such as filtering by unhealthy deployments and searching by hosted container. Referring to FIG. 6B, a user may access health user interface 1400 through DAS user interface 1000. In some embodiments, a user may request access to the health program while utilizing the DAS user interface 1000. Using a structure map, the request may be fulfilled through a repository and routelog, combined with the deployment information from a deployment API. The structure map that may show the structure of a digital application system, including the pages and sub-pages within the application system. In some embodiments, a response to the request may be returned and formatted to fit DAS user interface 1000. The response may include the information to enable the functions, such as displaying the deployment under the structure map with each page.

Health API 2000 may use Hypertext Transfer Protocol (HTTP) request/response formatting to generate the requests made by the front end. In some embodiments, health API 2000 may use HTTP request/response formatting to generate the response given by the backend. Health API 2000 may process the requests to access services and display the data through accessing specific endpoints. In some embodiments, health API 2000 may request to display the overall application data on the health user interface 1400 1400 by a request with text "to/pages endpoint." In some embodiments, health API 2000 may request to display the specific namespace and deployment data on the health user interface 1400 1400 by a request with text that displays "to/namespaces endpoint."

Consistent with disclosed embodiments, health API 2000 may include controllers, services, and responses. The controllers may include a page controller, namespace controller, and scheduler controller. The service may include a page service, namespace service, and deployment service. The response may include a page response and a namespace response.

A controller may refer to a class that implements operations defined by an application's API. A controller may implement an application's logic and act as a bridge or connection between the HTTP/REST API and domain/database models. A page controller may handle a request for a specific page or action on a website. A page controller may have access to a routeLog and a deployment log. A routelog may be a JavaScript Object Notation (JSON) representation of all pages, containing hierarchical structure (e.g., parent page or child page) and all associated components (e.g., micro-applications UIs) of the pages. A page controller may receive the request and access page data via the process implemented in the page service (e.g., GET page process 2500, as referenced in FIG. 8).

A namespace controller may be configured to allow a user to search for a specific namespace and be able to view all deployments under that namespace. In some embodiments, a namespace controller may only pass a request if it meets the acceptable string criteria for a namespace. In some embodiments, if a namespace controller fails, an HTTP error is returned. A namespace controller may receive the request and access namespace deployment information implemented in namespace service.

Figure 8:
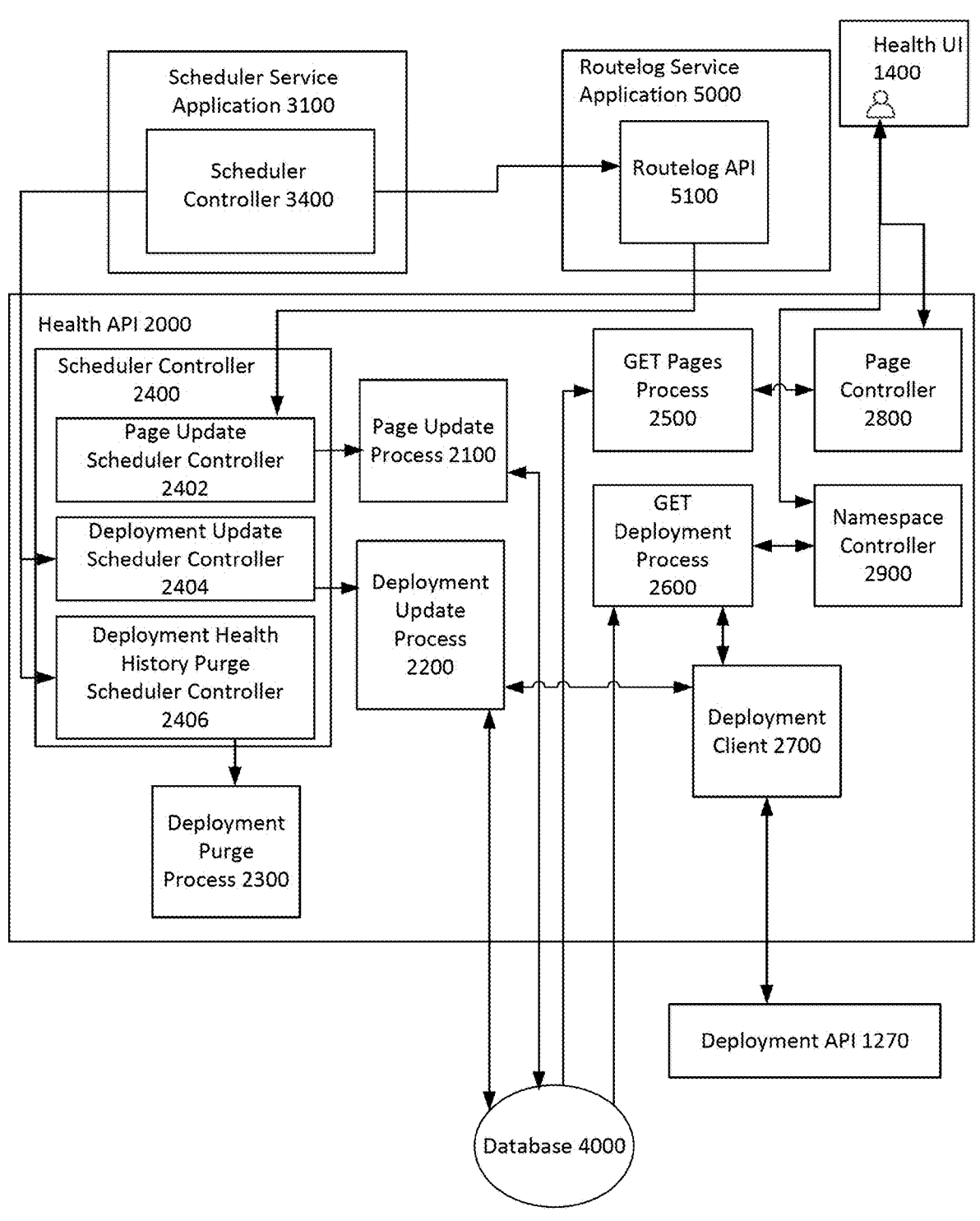
FIG. 8 is a diagram of an exemplary health API service flow for monitoring health of a digital application system, consistent with disclosed embodiments.
Figure 9:
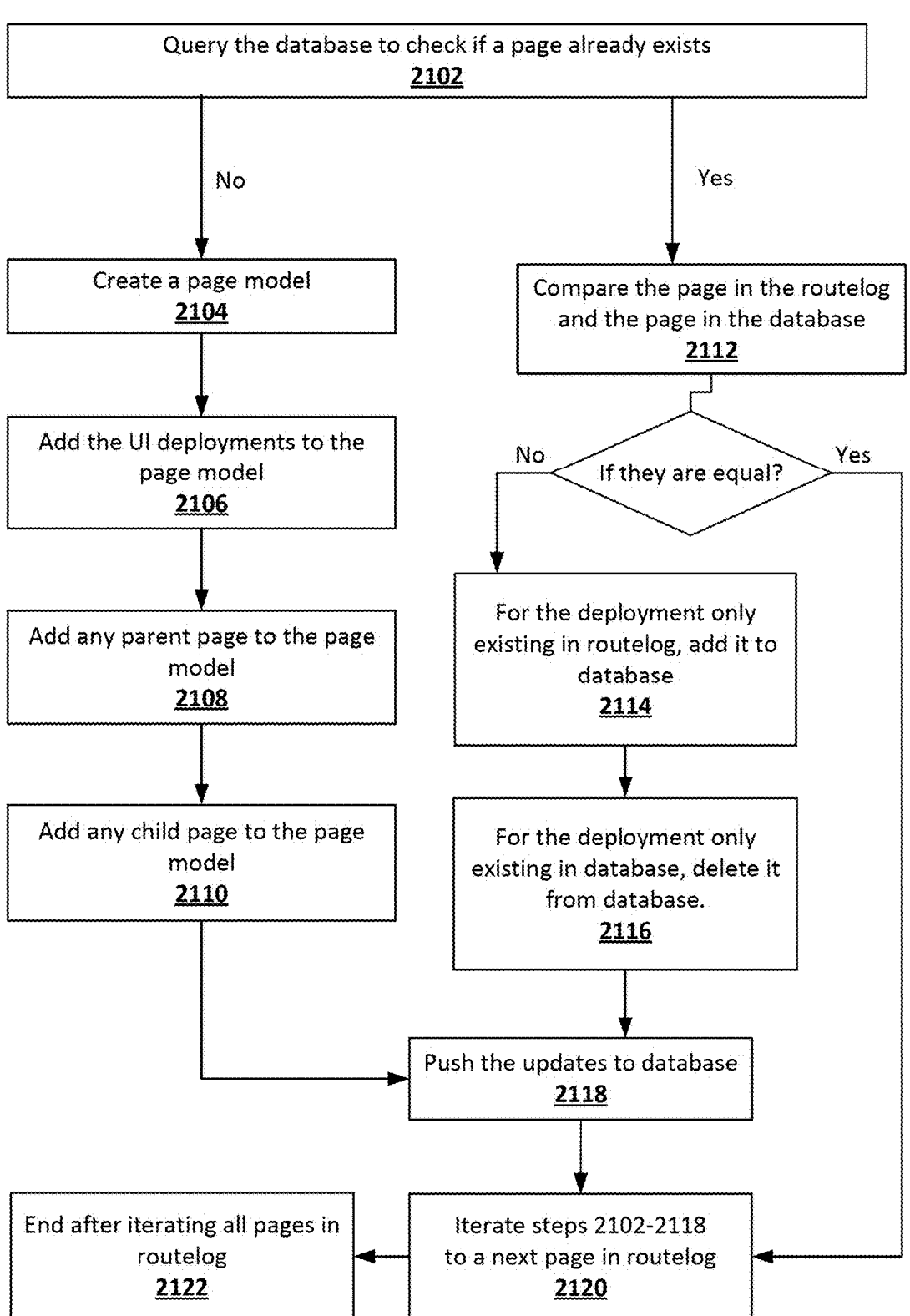
FIG. 9 is a flowchart of an exemplary page update process, consistent with disclosed embodiments.

A scheduler controller may be configured to update a database, such as database 4000, on a scheduled basis. In some embodiments, at least two controllers may be implemented in the scheduler controller, the page update scheduler and the deployment update scheduler. In some embodiments, the scheduler controller may further include a deployment health history purge scheduler. A page update scheduler may update the database with page data at a predetermined time period or a first scheduled period, such as every Saturday at noon. A deployment update scheduler may update database with deployment data at a predetermined time period or a second scheduled period, such as every 5 minutes. As illustrated in FIGS. 8-10, a scheduler controller may call the automatic update methods implemented in deployment service and page service that perform the updates to the database.

Services in health API 2000 may be interfaces that provide a program with a description of how to interact with a system in order to retrieve and/or change the data within it. A page service may be configured to access the database. A page service may get deployment and routelog information for every page and insert the deployment and routelog information into a response. A namespace service may be configured to receive a request for obtaining deployment information. The namespace service may then retrieve the deployment associated with a given namespace via a deployment client. Additionally, the namespace service may be configured to insert all the deployments of the namespace into a response. A deployment client may be configured to pull a list of all current deployment conditions and health from a deployment application. The deployment client may send the list of current deployment conditions to an application API. The application may use the response to update the deployment. A deployment service may be configured to automatically update deployments in the database through accessing the deployment client and retrieving all deployments.

Responses may refer to the data or information that is returned from a server when an API request is sent. A response may be in the form of a JSON or XML document and contain at least one of a status ("ok", "error", etc.) and data (e.g. a list of items). In some embodiments, responses may be generated by using controllers and services. Responses may include a page response and a namespace response. A page response may be configured to return a response to the request sent from the page controller with the deployment and routelog information for the page collected by the page service. A namespace response may be configured to return a response to the request sent from the namespace controller with all the deployment information under the namespace collected by the namespace service.

The scheduler controller and the deployment service that may be part of health API 2000 may communicate with the database. Scheduler controller and deployment service may be configured to update the database with the latest deployment API and page data on a timed interval so that health user interface 1400 may get updated with the latest data on a timed interval through Health API 2000's request and response.

In some embodiments, deployment API 1270 may allow update service 3000 to pull a list of all deployments currently registered under DAS user interface 1000 of the digital application system, all pods created for that deployment, all containers hosted by those pods, and the pods' and containers' current status, including health status. In some embodiments, DAS repository 1120 may provide a large list of structure files that may be processed by update service

3000. In some embodiments, update service 3000 may schedule job requests to generate a structure map with a list of each page in the digital application system and what deployments may be delivered to those pages. The structure map may include the structure relationships of the system involving UIs, pages, and deployments. Health APP 2000 may refer to the structure relationship in the structure map to build representational structure within its database. In some embodiments, the structure information contained within the structure map may be linked with the health and status information by health API 2000 to be available for delivery to health user interface 1400.

As further illustrated in FIG. 6B, health application 1300 may provide health user interface 1400, which may be configured to include time range selector 1405, parent page 1410, sub-page 1420, and other pages 1430. Health user interface 1400 may retrieve data from health API 2000 by making a GET request. A GET request may be an HTTP request method that allows users to retrieve data from a data source. Health API 2000 may return a JSON response of the status of all the DAS application pages. Each JSON response may contain a status of the response, a list of all parent pages, and a list of all associated subpages. After receiving the JSON response, health user interface 1400 may leverage JavaScript to iterate over all page information contained in the response, insert that information into HTML components representing a page, and insert those HTML components into the Document Object Model (DOM). As the DOM receives the updates, the end user may see sitemap information populates on their web page. The sitemap information may refer to a structure map that may show the structure of a digital application system, including the pages and sub-pages.

The status of the response may include "success" or "failure." Parent page 1410 may include page metadata, which includes at least one of localPath, parentPath, full-Path, and page name. Parent page 1410 may also include a list of all associated deployments. Each deployment includes deployment metadata and recent health information. Deployment metadata may include app name, release name, namespace, UI name, outer API name, and list of inner API names. Recent health information may include availability, ready, and total replicas, last update time, and health status.

The user interface may check for new information from the GET response endpoint at a predetermined time period. Deployments that meet the API-defined criteria for health may be displayed in the health user interface with a green shade or with no shade. If any deployment on the page reports "Unhealthy" via the API, the corresponding page in the user interface will switch to a light shade, as shown in FIG. 6B, and/or may display an exclamation point, or may be replaced by any pattern and/or color to provide an immediately recognizable visual distinction from healthy pod groups and containers. By selecting dark shade buttons displayed on the unhealthy page, users may expand details and view any deployments with issues. The dark shade buttons may be replaced by an exclamation point or any pattern and/or color to provide an immediately recognizable visual distinction from healthy pod groups and unhealthy pod groups.

These unhealthy deployments may also be listed with a vitals button, which enables end users to access health vitals modal, e.g., health vitals 1500, and investigate the root cause of the unhealthy deployment. The health vitals modal, e.g., health vitals 1500, may refer to a modal that may list all active pods (e.g., Micro-App 3 Pod 1 1510, Micro-App 3 Pod 2 1520, etc.) that may be used by different users. The health vitals modal may flag any pods that may be unhealthy. The root cause may refer to a pod experiencing an out-of-memory error, causing it to crash and drop ongoing requests; a pod experiencing a break in networking communication, unable to make receive requests or make outgoing requests; or an issue occurring on pod start-up, such as an unavailable database or other communication pre-requirement, causing a crash loop backoff. The crash loop backoff may refer to a pod that is stuck in a restart loop, where containers repeatedly crash and restart.

Health user interface 1400 may list each endpoint in the digital application system. In some embodiments, health user interface 1400 may list an array of micro-applications servicing users based on a load balancing function. Health user interface 1400 may show how many instances may be available and how many are online, including each of the micro-application members of the array.

As shown in FIG. 6B, expanding each page (e.g., parent page 1410 and sub-page 1420), a list of all deployments-groups of pod groups, such as pod group 1, pod group 2, pod group 3, pod group 4, and pod group 5 that may be shown on parent page 1410 and sub-page 1420 may be displayed, along with indicators of current overall health, such as healthy 1412, healthy 1414, unhealthy 1416, healthy 1422, and healthy 1424. Health user interface 1400 may also display the count of existing and ready replicas. In some embodiments, health user interface 1400 may display all containers that each deployment may be hosting. If the page has any sub-pages, those may be expanded in a nesting fashion, with the same deployment information that may be available on the parent page.

Consistent with disclosed embodiments, a pod group may refer to a group of deployment pods from a micro-application. When a deployment is created, multiple pods, which are replicas of one another, may be created. For example, pod group 3 may refer to a group of micro-app 3 pods (e.g., micro-app 3 pod 1 1510 and micro-app 3 pod 2 1520). Micro-app 3 pod 1 1510 and micro-app 3 pod 2 1520 may be identical, but the name and possibly the hosting location may differ. For instance, two users may load the same page that may contain micro-app 3, one user's response may come from micro-app 3 pod 1 1510, and the other user's response may come from micro-app 3 pod 2 1520. When deployment pod group 3 contains an unhealthy indicator, such as unhealthy 1416, a vitals button 1418 and a metrics button 1419 may appear within pod group 3. In some embodiments, vitals button 1418 and metrics button 1419 may display on every pod group regardless of the deployment health conditions. Unhealthy 1416 may be shown in light shading, and unhealthy inner API 1 container 1526 may be shown in darker shading when listed in a separate interface of health vitals 1500, as illustrated in FIG. 6B. The separate interface may be one way to display health vitals 1500, which may be replaced by any pattern and/or ways to display health vitals 1500. The light shade showing unhealthy 1416 or the dark shading showing unhealthy inner API 1 container 1526 may be replaced by any pattern and/or color to provide an immediately recognizable visual distinction from the healthy pod groups and containers.

Selection of vitals button 1418 may cause the system to generate a separate health vitals 1500 to list all active pods (such as micro-app 3 pod 1 1510 and micro-app 3 pod 2 1520 in the illustrated example) in pod group 3. Micro-app 3 pod 2 1520, as well as any other pods registered unhealthy, may be flagged. Responsive to a user input or one or more settings associated with automatically displaying information for an unhealthy pod, an unhealthy pod row may be visually expanded to display a list of each container, including UI container 1522, outer API container 1524, inner API 1 container 1526, and inner API 2 container 1528 within pod 1520. Expanding the unhealthy pod row may also list current health information, and if unhealthy, the deployment application may generate a reason and output message.

In some embodiments, selecting metrics button 1419 may pop up a separate view, health metrics 1600, to display several time charts. Health user interface 1400 may call endpoint when clicking metrics button under a deployment. A selection of time stamp "from" and "to" under time range selector 1405 may specify the time frame for the time chart. The time charts of health metrics 1600 may refer to the monitoring results of each container. The monitoring results of each container may include at least one of availability percentage, memory usage percentage, CPU usage percentage, and outer metrics, response count, median response time, and $90^{th}$ percentile response time.

Consistent with disclosed embodiments, health metrics 1600 may include container availability 1610, CPU usage 1620, memory usage 1630, and outer metrics 1640. Container availability may refer to when the container is running and is considered by the deployment application to be able to receive requests. Container availability may reference all pods, and may be the percentage of the containers that are considered available. CPU usage may refer to the percentage of a computer's processing power that is being used to perform tasks at any given time. Memory usage may refer to the percentage of a container's real memory that is being used. Outer metrics may refer to metrics related to outer APIs, for example, outer API's deployment related service success rate, response count, median response time, and 90th percentile response time. In some embodiments, the data on the time charts may be obtained by the median across all instances of the outer API within the pod group. Service success rate may refer to the percentage of all responses that may be not of a 500 response code. A 500 response code, also known as an HTTP 500 Internal Server Error, indicates that a server encountered an unexpected condition and was unable to fulfill a request. Response count may refer to the numbers of responses received by a deployment's outer API. Median response time may refer to the middle value of all response times of a deployment's outer API. The $90^{th}$ percentile response time is a metric that indicates that 90% of requests are completed within a given time limit, while the remaining 10% take longer. Percentiles are a useful metric for understanding the distribution of response times.

Figure 7:
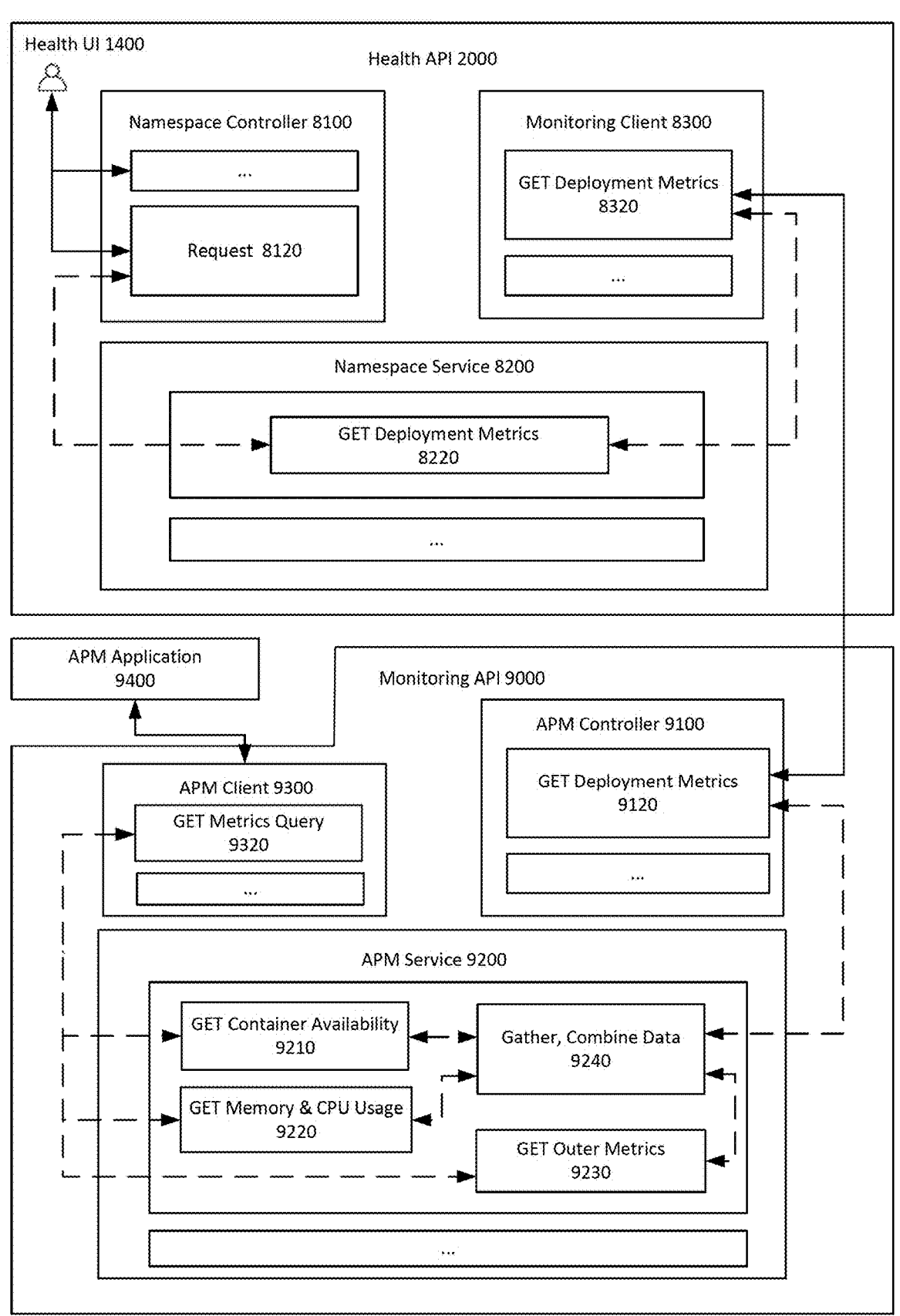
FIG. 7 is a diagram of an exemplary program monitoring service flow for obtaining time chart for metrics, consistent with disclosed embodiments.

FIG. 7 is an exemplary program monitoring service flow for obtaining a time chart for metrics, consistent with disclosed embodiments. A user may click a metrics button 1419 (shown in FIG. 6B) for a specific namespace of a pod group via health user interface 1400. As shown in FIG. 7, the health API 2000 may include namespace controller 8100, namespace service 8200, and monitoring client 8300 to facilitate obtaining deployment metrics information. The deployment metrics information may include monitoring information such as status and performance information for a container being monitored. As discussed with respect to FIG. 6B, the deployment metrics may include container availability 1610, CPU usage 1620, memory usage 1630, and outer metrics 1640.

Referring to FIG. 7, namespace controller 8100 may refer to a namespace controller that may be configured to allow a user to view deployment metrics, including the status and performance information under that namespace. Namespace controller 8100 may be configured to process request 8120 to pull deployment metrics information for the specific namespace and pass request 8120 to namespace service 8200. Request 8120 may refer to a request that may be generated corresponding to the user's request to view the metrics of deployment metrics for a specific namespace.

Namespace service 8200 may refer to a namespace service that may be configured to receive a request from namespace controller (e.g., namespace controller 8100) for obtaining deployment metrics information. Namespace service 8200 may be configured to retrieve the deployment metrics associated with a given namespace via a monitoring client (e.g., monitoring client 8300). Namespace service 8200 may be configured to insert all the deployment metrics information of the namespace into a response and send it to namespace controller 8100. Namespace service 8200 may be configured to access the deployment metrics information via a monitoring client (e.g., monitoring client 8300) by sending a GET request, e.g., GET deployment metrics 8220. GET deployment metrics 8220 may be a GET request to access deployment metrics from a monitoring API via a monitoring client (e.g., monitoring client 8300).

Monitoring client 8300 may refer to an application client that may be configured to process requests (e.g., GET deployment metrics 8320) to collect information (e.g., deployment metrics) from a monitoring application interface (e.g., monitoring API 9000). Monitoring client 8300 may be configured to receive a response with the deployment metrics information from a monitoring application and process the response to namespace service 8200 and namespace controller 8100 to display the deployment metrics information to the user. GET deployment metrics 8320 may refer to a GET request to access and collect deployment metrics from the monitoring API. In some embodiments, GET deployment metrics 8320 may be a GET request (e.g., GET deployment metrics 8220) received from namespace service 8200.

Monitoring API 9000 may refer to an application programming interface (API) configured to process a request from a monitoring client (e.g., monitoring client 8200), access and obtain the requested data, like deployment metrics, from an application performance monitoring (APM) application (e.g., APM application 9400), gather and combine the received data, and send the requested data back to the monitoring client. The status may include container availability percentage, memory usage percentage, CPU usage percentage, and outer metrics, for example, outer API's deployment related service success rate, response count, median response time and $90^{th}$ percentile response time. Monitoring API 9000 may include APM (application performance monitoring) controller 9100, APM service 9200, and APM client 9300.

APM controller 9100 may refer to an application performance monitoring controller that may be configured to receive a request from monitoring client 8200, process a request to APM service 9200, and send a response back to monitoring client 8200. APM controller 9100 may be configured to access deployment metrics via APM service 9200 and APM client 9300 by sending a request (e.g., GET deployment metrics 9120) to APM service 9200. GET deployment metrics 9120 may refer to a request to obtain and combine data for deployment metrics information.

APM service 9200 may refer to an application performance monitoring service that may be configured to receive a request from APM controller 9100 and generate requests to obtain metrics information and combine the metrics information. The requests may include GET container availability 9210, GET memory & CPU usage 9220, GET outer metrics 9230, and gather, combine data 9240. GET container availability 9210 may refer to a GET request to obtain container availability information via APM client 9300. GET memory & CPU usage 9220 may refer to a GET request to obtain the memory usage percentage and the CPU usage percentage from the APM application (e.g., APM application 9400) via APM client 9300. GET outer metrics 9230 may refer to a GET request to obtain outer metrics information, such as, the outer API's deployment related service success rate, response count, median response time, and $90^{th}$ percentile response time. Gather, combine data 9240 may refer to a request to gather the obtained deployment metrics from APM application 9400 via APM client 9300 and combine the data together into a response ready to send it back to health API 2000 via APM controller 9100, monitoring client 8300, namespace service 8200, and namespace controller 8100.

APM client 9300 may refer to an application performance monitoring client that may be configured to process requests (e.g., GET metrics query 9320) to obtain the requested deployment metrics information from an application performance monitoring application (e.g., APM application 9400). APM client 9300 may be configured to receive a response with the deployment metrics information from APM application 9400 and send the response to APM service 9200. GET metrics query 9320 may be a GET request to access and obtain metrics information from the APM application. In some embodiments, GET metrics query 9320 may include one or more GET requests (e.g., GET container availability 9210, GET memory & CPU usage 9220, and/or GET outer metrics 9230) from APM service 9200.

APM application 9400 may refer to an application performance monitoring application that may be used as a tool used to monitor the performance of an application. For example, an APM application may include DYNATRACE, DATADOG, NEW RELIC, and APPDYNAMICS. The performance may be monitored by tracking various components of performance metrics, for example, container availability, CPU usage, memory usage, the outer API's deployment related service success rate, response count, median response time, and 90th percentile response time, as shown in health metrics 1600 of FIG. 6B.

FIG. 8 illustrates an example of a flow for monitoring and obtaining the health and status of a digital application system, consistent with the disclosed embodiments. Health API 2000 may include page controller 2800, namespace controller 2900, and scheduler controller 2400. A controller may refer to a class that implements operations defined by an application's API. A controller may implement an application's logic and act as a bridge or connection between the HTTP/REST API and domain/database models. Page controller 2800 may receive a request from the front end and access page data via GET page process 2500. GET page process 2500 may include one or more processes to obtain page information from the database. GET page process 2500 may initiate by retrieving all pages in the database that have no parent page. These pages, which may not have a parent page, may be the top layer page in the hierarchical sequence. GET page process 2500 may then add each nested level, e.g., child pages, deployments, and deployment health, in a hierarchical sequence of structure map. The results of GET page process 2500 may be serialized into JSON and returned to page controller 2800 with a successful status. As discussed herein, a namespace controller may be configured to allow a user to search for a specific namespace and be able to view all information under that namespace. In some embodiments, a namespace controller may receive a request and access deployment metrics under that namespace from a monitoring application. As illustrated in FIG. 8, namespace controller 2900 may receive a request from health user interface 1400 to obtain deployment information for each container within the pods of the namespace. Namespace controller 2900 may access the deployment data via GET deployment process 2600. GET deployment process 2600 may refer to one or more processes that may be configured to obtain deployment information for all pods, along with the metadata associated with each pod from the deployment API (e.g., deployment API 1270) via deployment client 2700.

As shown in FIG. 8, scheduler controller 2400 may include at least three types of scheduler controllers: page update scheduler controller 2402, deployment update scheduler controller 2404, and deployment health history purge scheduler controller 2406. In some embodiments, schedule controller 2400 may run at least one of page update scheduler controller 2402, deployment update scheduler controller 2404, or deployment health history purge scheduler controller 2406. The page update scheduler controller 2402 may refer to a scheduler controller that may be used to update pages by running the page update process under a predetermined schedule or a first scheduled period. Deployment update scheduler controller 2404 may refer to a scheduler controller that may be used to update deployment by running the deployment update process under a pre-determined schedule or a second scheduled period. Deployment health history purge scheduler controller 2406 may refer to a scheduler controller that may be used to delete deployment health history by running the deployment health history purge process to delete deployment health history older than a predetermined time determined by a third scheduled period.

As illustrated in FIG. 8, page update scheduler controller 2402 may receive a POST request from routelog service application 5000 through routelog API 5100, containing the full up-to-date routelog. A POST request may refer to a type of HTTP method used to send data from a client (such as a web browser) to a server. In response to a user submitting information, such as via a form on a web page, the data may be sent to the server using a POST request. The request may include the data as part of the request body, and the server may process the data and send a response back to the client. In some embodiments, a data routelog may be a representation of all pages in one or more file formats, such as JSON. In some embodiments, the routelog may contain the hierarchical structure of pages, such as, one page being a parent of another page. The routelog may also contain all associated components of the micro-application user interfaces, consistent with disclosed embodiments.

Routelog service application 5000 may refer to an application that may be used to retrieve page file information from the source code repository (e.g., source code repository 7000) and process the page file information through the routelog update process (e.g., routelog update process 5300) to update the routelog. Routelog API 5100 may refer to an application program interface that may be used for routelog service application 5000 to communicate with other program applications, such as receiving a request to update routelog and sharing the updated routelog via sending back a response to the other program applications. In some embodiments, page update scheduler controller 2402 may de-serialize the routelog from a byte stream into a Java object, then pass the Java object to page update process

2100. Page update process 2100 may iterate through each page to perform a page update flow, as further described with respect to FIG. 9.

As shown in FIG. 8, deployment update scheduler controller 2404 may receive an empty POST request from scheduler controller 3400 that may be included in scheduler service application 3100. Scheduler service application 3100 may refer to an application to schedule the tasks, such as updating pages, deployments, and health history, on a scheduled basis via scheduler controller 3400. Scheduler controller 3400 may refer to a controller that may be configured to send out scheduled update requests to routelog API 5100 for proceeding to page update process, or send out scheduled requests to deployment update scheduler controller 2404 to update deployment, or send out scheduled request to deployment health history purge scheduler controller 2406 to delete the deployment health history data. Deployment update scheduler controller 2404 may start deployments update process 2200, shown in more detail in FIG. 10. Deployment update process 2200 may start by sending a request to retrieve the current state of all deployments from deployment API 1270 (as previously described herein) via deployment client 2700. Deployment client 2700 may refer to an application client that may make request to an application API (e.g., deployment API 1270) to retrieve some information or change something within the application. In some embodiments, the response from deployment API 1270 may be received in byte stream format and may be de-serialized into a list of Java objects. Converting a byte stream format into a Java object is known as deserializing, and converting a Java object into a byte stream format is known as serializing. The class object may get serialized/deserialized by a serializable interface. The serializable interface may be a marker interface that may come under the Java package that may allow Java classes to be serialized. In some embodiments, the response may include deployment information in a byte stream format and may proceed to be de-serialized into a list of Java objects to be updated or saved in a database.

Health API 2000 may include a page controller 2800, which may execute a GET page process 2500. In some embodiments, page controller 2800 may receive a GET request from either the health UI or an upstream API. The upstream API may refer to an API that receives input from an upstream system. The upstream system may refer to a system that receives input or provides raw data for processing, such as a digital application system. Subsequently, page controller 2800 may initiate GET page process 2500, in which one or more processors may send a request to the database to retrieve all pages without a parent page. These pages without a parent page may be the top-level pages in the structure map. There may be no parent page on top of these pages. These pages without a parent page may become a parent page for their child pages, or they may be a single page without a child page. GET page process 2500 may then proceed to retrieve calls for each nested level, including child pages, deployments, and deployment health, in hierarchical order. A nested level, as discussed herein, may refer to a component or element that is contained within another component or element. For example, one or more levels may be nested during the development of complex software applications having several interdependent parts. In some embodiments, the results may be serialized from Java objects into JSON format and returned to the caller with a successful status.

As further shown in FIG. 8, health API 2000 may include a namespace controller 2900, which may obtain deployment information through GET deployment process 2600. In some embodiments, namespace controller 2900 may receive a GET request from either the health UI or an upstream API. The user of the health application may have an option to send a GET request from either the health UI or the upstream API. The health UI and the upstream API may have access to the health API to send the GET request to the health API. The GET deployment process 2600 may use the namespace and release to call the deployment API 1270 through deployment client 2700. The deployment API 1270 may return a JSON response that may include representations of all pods under that deployment, with the full metadata associated with each pod. The metadata may include application name, release name, namespace, UI name, outer API name, and list of inner API names. The JSON response may be de-serialized, filtered, and reformatted to a list of pods that includes a list of containers with their corresponding current status. The response may then be serialized and returned with a successful status. The response may include deployment results, e.g., healthy or unhealthy. The response may include recent health and status information, such as, container availability, memory & CPU usage, outer metrics including response time, etc.

In some embodiments, scheduler controller 2400 may further include deployment health history purge scheduler controller 2406, as shown in FIG. 8. Deployment health history purge scheduler controller 2406 may be scheduled to delete deployment health history via deployment health history purge process 2300 for a pre-determined time or at a set time interval. For example, deployment health history purge scheduler controller 2406 may receive an empty POST request from scheduler controller 3400 of scheduler service application 3100 daily at 8:00 μm and the information stored in a database, such as database 4000 may be purged if the information has been store for longer than a scheduled time interval, for example, 30 days. As further illustrated in FIG. 10 hereafter, the deployment health history may refer to a deployment health history table in the database, which will only be updated for adding the new deployment during deployment update process 2200. Nothing in the deployment health history will be deleted during the deployment update process 2200. As a result, the deployment health history table's size may keep growing. The old entries need to be deleted to keep the health history table's size manageable. In some embodiments, deployment purge process 2300 may include an operation to delete the deployment health history from the database. In some embodiments, deployment purge service 2300 may target one or more deployment entries of deployment health history over than a certain amount of time, for example, 30 days. The process may return a successful completion message to scheduler controller 2400.

Some embodiments may involve task scheduling for one or more processors, such as task scheduling for a server. Task scheduling may involve a job scheduler utility, such as a command run on notice (CRON) utility that schedules CRON commands, or CRON jobs. In such embodiments, the utility may run as a background service and execute commands (jobs) at a specified time, or at a regular interval. In some embodiments, page update scheduler controller 2402 may schedule the page update CRON job to run at a first scheduled period. For example, a page update job may be preconfigured to run every Saturday at 12 pm ET. Similarly, deployment update scheduler controller 2404 may schedule the update job for deployment to run at a second scheduled period. For example, the deployment update job may run every 5 minutes. Furthermore, deployment health history purge scheduler controller 2406 may schedule the deletion of certain health histories at a third scheduled period. For example, the deployment health history purge job may run every night at 8 pm ET. In some embodiments, one or more of the first scheduled period, the second scheduled period, and the third scheduled period may occur one or more times hourly, daily, weekly, or monthly.

FIG. 9 is a flow chart of an exemplary page update process 2100, consistent with disclosed embodiments. In some embodiments, page update process 2100 may execute steps listed in FIG. 9 to update pages once receiving a request from page update schedule controller 2402. For each page, the page update process 2100 may iterate through the steps listed in FIG. 9.

At step 2102, the process may query a database, such as database 4000 (as illustrated in FIG. 8) to determine whether a page already exists in the database or not. If the page does not exist in the database, the process may proceed to step 2104. However, if the page exists in the database, the process may instead proceed to step 2112. Page update process 2100 may be designed to handle situations where a page may need to be added to or updated in a database, and the process may take different steps depending on whether the page already exists in the database or not.

In some embodiments, in response to checking if a page already exists in the database, process 2100 may proceed to step 2104, where a new page model may be created, when the page does not exist in the database. The page model may refer to a model used to create and define a page and store the page information in the database. The page model may be created to include all page metadata provided by routelog. The page metadata may include data such as localPath, parentPath, fullPath, page name and descriptions. A routelog may refer to a JavaScript Object Notation (JSON) representation of all pages, containing hierarchical structure (e.g., parent page or child page) and all associated components (e.g., micro-applications UIs) of the pages.

In some embodiments, page update process 2100 may proceed to step 2106 after completing step 2104. At step 2106, process 2100 may add deployments of a user interface (UI) to the page model. Specifically, process 2100 may iterate through each page component that may be tagged as a UI, such as, UI 412 and UI 422 of page 310, as referenced in FIG. 4. Subsequently, process 2100 may query the deployments table for a deployment containing the UI, searching for all deployments of UI 412 and UI 422 from the deployments table, which may lead to Micro-App 1 Pod 510 and Micro-App 2 Pod 520 as referenced in FIG. 5. Finally, process 2100 may add the deployment as a served deployment to the page model that was created in step 2104.

In some embodiments, page update process 2100 may then proceed to step 2108 by adding any parent page information to the page model. Step 2108 may ensure that the page model accurately reflects the hierarchical structure of the digital application system. Process 2100 may query the page's routelog to determine if a parent page exists at the designated parent path. If a parent page is found, the parent page will be added to the page model. This may ensure that the page model includes all necessary information about the page's parentage, which can be useful for various purposes such as navigation.

In some embodiments, page update process 2100 may then proceed to step 2110 by adding any relevant child page information to the page model. Step 2110 may be performed by querying the page's routelog to determine if a child page exists. If a child page is found to exist, the child page may be subsequently added to the page model. This process may ensure that all relevant information pertaining to the page and its child pages may be included in the page model. The updated page model then may be saved in the database at step 2118 and advanced to a new page at step 2120, as described hereafter.

Referring back to step 2102, when process 2100 may query the database and determine that the page already exists in the database, the process may proceed to step 2112 to compare the page in the routelog and the page in the database. To complete this comparison, process 2100 may pull all UI deployments of the page from the routelog, as one set of UI deployment data; and process 2100 may further pull UI deployments of the page from the page model that may be saved in the database, as another set of UI deployment data. Process 2100 may compare two sets of UI deployments to determine if the two sets of data are equal. If the two sets of data are equal, which also means that all UI deployments in routelog also exist in the page model of the database, the process may skip step 2114, and the process instead may proceed to step 2120 to iterate from step 2102 to step 2118 again for a next page in routelog.

On the other hand, if the two sets of data are not equal, for example, in some embodiments, at least one UI deployment may only exist in routelog. Alternatively, or concurrently, at least one UI deployment may only exist in the page model of the database. In some embodiments, in response to determining that the two sets of UI deployment data are not equal, process 2100 may proceed to steps 2114 and 2116 for each unequal UI deployment. For any UI deployment that exists solely in routelog, process 2100 may move to step 2114 and add the UI deployment to the page model of the database. In contrast, for any UI deployment that exists solely in the page model of the database, process 2100 may advance to step 2116 and delete the deployment from the page model of the database.

After completing steps 2114 and 2116 for all unequal UI deployment, all the latest UI deployments in routelog may be added to the page model of the database, and all the removed UI deployments in the routelog may be deleted from the page model of the database. Consequently, the UI deployments of routelog may be identical to the UI deployments of the page mode of the database. Process 2100 may move to step 2118 to save the updates of UI deployments and then move further to step 2120 to iterate steps 2102-2118 for a next page in routelog.

In some embodiments, page update process 2100 may proceed to step 2118 to push the updates to the database. The updates may include creating and updating the page model throughout steps 2104 to 2110. The updates may also include comparing and updating the UI deployments of existing pages between the routelog and the page model of the database. Once the updates have been successfully saved, page update process 2100 may proceed to step 2120, which involves iterating from steps 2102 to 2118 on to a next page in the routelog. This step may ensure that page update process 2100 continues to operate entirely and thoroughly. By moving on to the next page in the routelog, page update process 2100 may continue to add or update all pages in the digital application system.

In some embodiments, once page update process 2100 has iterated through all pages in the routelog using steps 2102 to 2118, process 2100 may proceed to step 2122. At this point, page update process 2100 may be considered complete and may be terminated. Step 2122 may involve sending a message indicating successful completion of the page update process to either page update scheduler controller 2402, or routelog service application 5000, as referenced in FIG. 8.

This message may serve as confirmation that all pages in the routelog have been successfully updated. By providing this feedback, the system may ensure that all necessary page updates have been made and that the page update process has been executed correctly.

By way of non-limiting example, FIG. 10 shows a flow-chart of an exemplary deployment update process 2200, consistent with disclosed embodiments. In some embodiments, deployment update process 2200 may execute steps listed in FIG. 10 to update each deployment upon receipt of an update deployment request. This request may be accompanied by the current state of all deployments, which may be retrieved from the deployment API by deployment update schedule controller 2404, as referenced in FIG. 8.

At step 2202, deployment update process 2200 may initiate by conducting a database query to determine the existence of the deployment. This may be achieved by comparing the deployment name against a comprehensive list of all deployment names extracted from the deployment table of the database. In the event that the deployment is not found, process 2200 may proceed to step 2204. However, if the deployment may be found, process 2200 may bypass step 2204 and instead proceed to step 2210. Deployment update process 2200 may be designed to handle situations where a deployment may need to be added to or updated in a database, and the process may take different steps depending on the presence or absence of the deployment in the database.

In some embodiments, in response to checking if a deployment name already exists in the database, process 2200 may proceed to step 2204, when the deployment name does not exist in the deployment name table in the database. At step 2204, a new deployment model may be created. The deployment model may refer to a model used to create and define a deployment and store the deployment information in the database. In some embodiments, the deployment model may store all deployment information provided by the deployment API. In some embodiments, the deployment model may include a deployment metadata that stores deployment information. The deployment metadata may include various details, such as the deployment's name, all pods, containers, and their respective labels and annotations.

In some embodiments, deployment update process 2200 may proceed to step 2206 by adding all deployment containers into the deployment model. Process 2200 may separate the deployment containers into different categories, such as, an outer container, a UI container, and one or more inner containers. Process 2200 may store the categorized containers into metadata of the deployment model.

In some embodiments, deployment update process 2200 may then proceed to step 2208 by adding the deployment model to the pages. Specifically, process 2200 may initiate a database query to retrieve a comprehensive list of all pages that have the identical UI container as the UI container of the deployment model. Once this list has been obtained, the deployment model may be added to each of the pages on the list.

In some embodiments, deployment update process 2200 may then proceed to step 2212 by adding current health status to the deployment health table and deployment health history table. The deployment health table may be a table in the database that stores the health status for the deployment, including the health status of all pods created for that deployment, the health status of all containers hosted by the pods. The deployment health table may provide the health status of pods and containers to the health user interface 1400, as referenced in FIG. 6B. The deployment health history table may be a table in the database that contains the history of the health status for the deployment. As will be described in steps 2210 and 2212 hereafter, for the existing deployment, the previously existing health status in the deployment health table will be deleted first, and then the new health status will be added. In some embodiments, for the deployment health history table, the new health status will be added directly without deleting the previous health status to maintain both health status and health histories.

Referring back to step 2202, when deployment update process 2200 queries the database and determines that the deployment already exists in the database, the process may then proceed to step 2210 to delete the previously existing health status of the deployment from the deployment health table. By accomplishing this step, the deployment health table will be ready to update with the current health status pulled from the deployment API. Without deleting the health status in the deployment health history table, the previous existing health status may be saved in the deployment health history table as part of the deployment history to track the overall health of the deployment over time.

After step 2210, deployment update process 2200 may proceed to step 2212. At step 2212, the current health status will be added to the deployment health table and deployment health history table.

In some embodiments, deployment update process 2200 may iterate through all the deployment pulled from the deployment API using steps 2202 to 2214, which may include creating the deployment model and updating the deployment health table. This step may be necessary to ensure that deployment update process 2200 continues to operate entirely and thoroughly for each deployment.

In some embodiments, deployment update process 2200 may proceed to step 2216 to push the updates to the database. At this point, deployment update process 2200 may be considered complete and be terminated. Step 2216 may involve sending a message indicating successful completion of the deployment update process to either deployment update scheduler controller 2404, or scheduler service app 3100 as referenced in FIG. 8. This message may serve as confirmation that all deployments from the deployment API have been successfully updated. By providing this feedback, the system may ensure that all necessary deployment updates have been made and that the deployment update process has been executed correctly.

Figure 11:
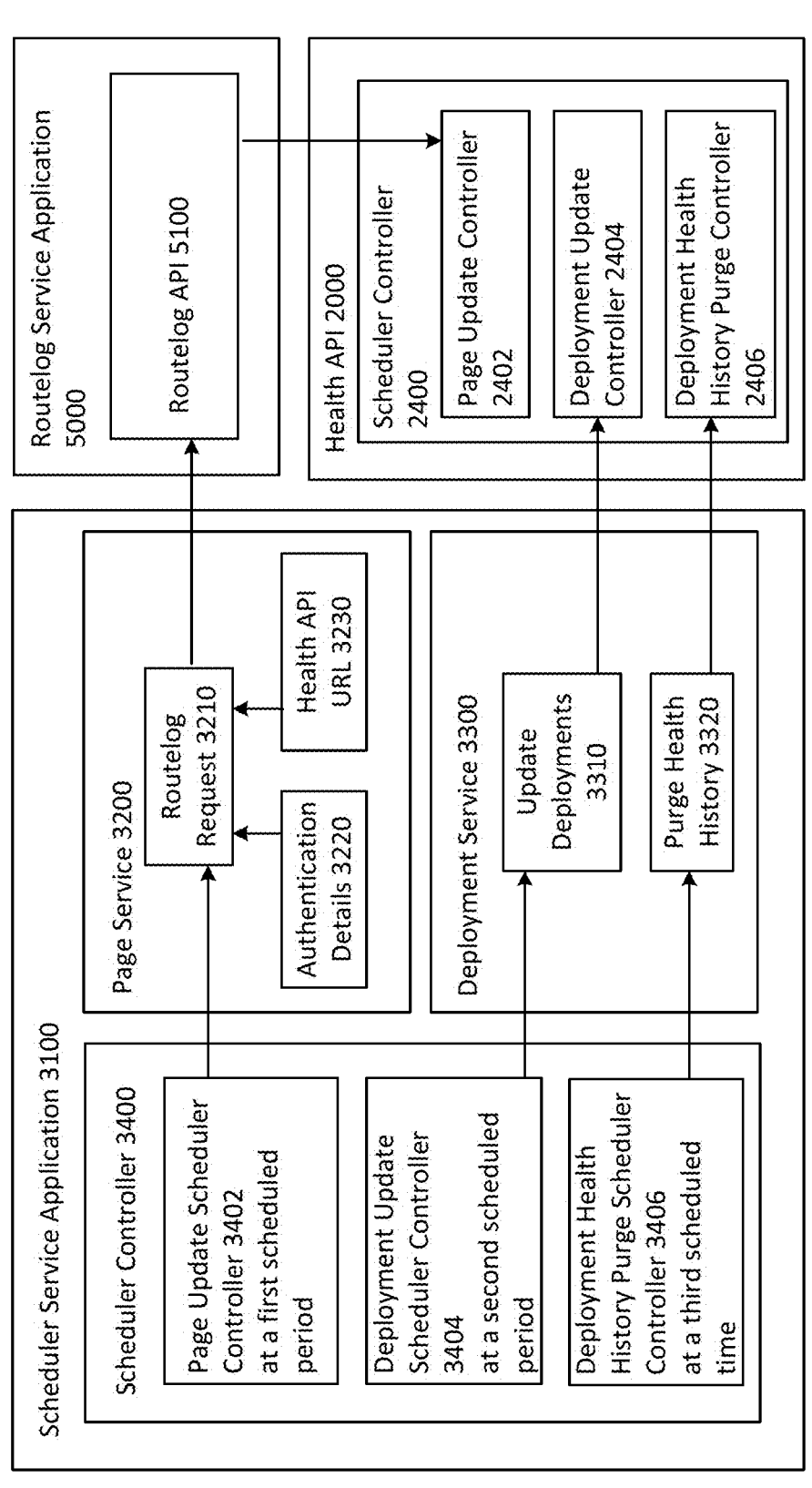
FIG. 11 is a diagram of an exemplary scheduler service application flow for scheduling various services, consistent with disclosed embodiments.

FIG. 11 depicts a diagram illustrating an exemplary scheduler service application for scheduling services to periodically update pages, update deployments, and purge the health history, consistent with disclosed embodiments. As shown in FIG. 11, scheduler service application 3100 may include scheduler controller 3400, page service 3200, and deployment service 3300. Scheduler controller 3400 may further include page update scheduler controller 3402 to update page at a first scheduled period, deployment update scheduler controller 3404 to update deployment at a second scheduled period, and deployment health history purge scheduler controller 3406 to delete the deployment entries older than a predetermined date by a third scheduled period.

In some embodiments, scheduler service application 3100 may involve task scheduling for one or more processors, such as task scheduling for a server. Task scheduling may involve a job scheduler utility, such as a CRON utility that schedules CRON commands, or CRON jobs. A CRON job may create jobs on a repeating schedule. In such embodiments, the utility may run as a background service and execute commands (jobs) at a specified time, or at a regular interval. With reference to FIG. 11, scheduler controller 3400 may be used to run tasks, such as, updating pages, deployments, and health history, on a scheduled basis through respective scheduler controllers: page update scheduler controller 3402, deployment update scheduler controller 3404, and deployment health history purge scheduler controller 3406.

In some embodiments, page update scheduler controller 3402 may schedule the page update CRON job to run at a first scheduled period. For example, a page update job may be preconfigured to run every Saturday at 12 pm ET. The first scheduled periods may vary, ranging from daily, weekly, monthly, to biannually, or annually, with options for scheduling every day, every two or three days, every week, or every two or three weeks, one, two, three, four, or five months, every half year, or every year.

As depicted in FIG. 11, scheduler controller 3400 may include a page update scheduler controller 3402 to schedule regular page update CRON jobs. When a page update CRON job is scheduled, the page update CRON job may call page service 3200 to initiate a routelog request 3210 to update pages, at the scheduled time. For example, the system may be configured to update the pages every Saturday at 12 pm ET.

Page service 3200 may be a component of scheduler service application 3100 that may be responsible for generating a routelog request 3210. Routelog request 3210 may refer to a request generated by page service 3200 to access and obtain updated routelog data from routelog service application 5000. Once routelog request 3210 is generated, page service 3200 may send routelog request 3210 to routelog service application 5000 via routelog API 5100. As illustrated in FIG. 8, routelog API 5100 may refer to an application program interface that may be used for routelog service application 5000 to communicate with other program applications. Routelog request 3210 may include authentication details 3220 and health API URL 3230.

Figure 12:
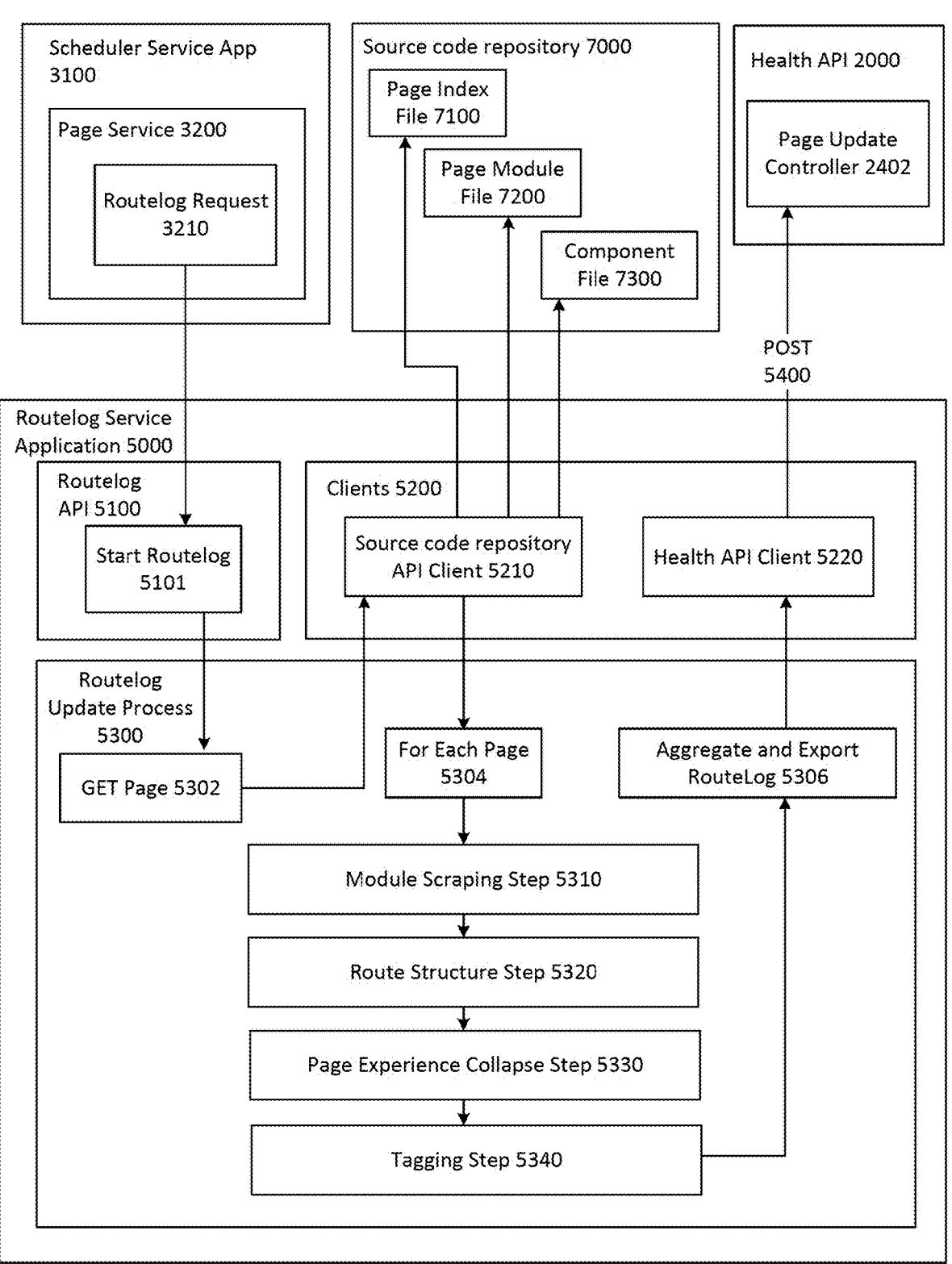
FIG. 12 is a diagram of an exemplary routelog service flow for updating pages, consistent with disclosed embodiments.

Authentication details 3220 may refer to authentication information included in a request (e.g., routelog request 3210). The authentication details 3220 may include a user-name and password, or other credentials that are used to enable the routelog service application 5000 to access source code repository 7000 (as illustrated in FIG. 12) via routelog API 5100. Source code repository 7000 may be a centralized location where developers can store and manage their source code for the pages. By including authentication details 3220 in routelog request 3210, page service 3200 ensures that only authorized users may access the source code repository 7000 and retrieve the page related data.

In some embodiments, when generating routelog request 3210, page service 3200 may include a redirection header that specifies a particular URL, in this case, health API URL 3230, in routelog request 3210. Health API URL 3230 may refer to the URL including health API address. By adding health API URL 3230, instead of returning the response to the scheduler service 3100, routelog service application 5000 may send the response to a designated endpoint (e.g., health API URL) specified in the redirection header contained within routelog request 3210. The response redirection header may consist of a URL address, such as, health API URL 3230. This feature may be useful in certain situations where it may be necessary to route responses to a specific location rather than back to the original requester.

Subsequently, Page service 3200 may transmit the generated routelog request 3210 to routelog API 5100 of routelog service application 5000, and page service 3200 may receive an acknowledgement from routelog service application 5000 via routelog API 5100. Upon receipt of the request, routelog service application 5000 may execute the routelog update process 5300 as illustrated in FIG. 12. Upon completion, routelog service application 5000 may transmit the response to the health API, as designated by the health API URL 3230. In this case, page update controller 2402, as referenced in FIG. 11, would be the recipient of the response.

In some embodiments, deployment update scheduler controller 3404 may schedule the deployment update CRON job to run at a second scheduled period. For example, a deployment update job may be preconfigured to run every five minutes. The second scheduled periods may vary, ranging from seconds, minutes, hourly, daily, or weekly, with options for scheduling every 30 seconds, every minute, every 5 minutes, every 10 minutes, every 30 minutes, every hour, every two or three hours, every day, every two or three days, every week, or every two or three weeks.

As depicted in FIG. 11, scheduler controller 3400 may include a deployment update scheduler controller 3404 that may be responsible for scheduling regular deployment update CRON jobs. At the scheduled time for executing the deployment update CRON job, the CRON job activates update deployments 3310 within deployment service 3300. Deployment service 3300 may include services related to updating deployments, which may be executed by update deployments 3310. Additionally, deployment service 3300 may include a service to delete the health status history of deployments, which may be executed by purge health history 3320. Once the CRON job activates update deployments 3310, update deployments 3310 may generate and send a request to the deployment update controller 2404, located on the pod doc API 2000. Deployment update controller 2404 may thereafter acquire the current status of all active deployments of the digital application system from the deployment API 1270 through deployment client 2700. Finally, deployment update controller 2404 may update the status of the deployments of health API 2000, as described earlier in deployment update process 2200, as referenced in FIG. 8 and FIG. 10.

In some embodiments, deployment health history purge scheduler controller 3406 may schedule the deletion of certain deployment health history at a third scheduled period. For example, the health history purge job may run every night at 8 pm ET. The third scheduled periods may vary, ranging from hourly, daily, weekly, or monthly, with options for scheduling every hour, every two or three hours, every 6 hours, daily, every two or three days, weekly, or every two or three weeks. In some embodiments, one or more of the first scheduled period, the second scheduled period, and the third scheduled period may occur one or more times hourly, daily, weekly, or monthly.

Referring still to FIG. 11, in some embodiments, scheduler controller 3400 may include deployment health history purge scheduler controller 3406, which may be responsible for scheduling a CRON job to call purge health history 3320 of deployment service 3300. Purge health history 3320 may then generate and send a request to deployment health history purge process 2406 in pod doc API 2000. Deployment health history purge process 2406 may thereby trigger the deletion of any health history table entries that have exceeded a predetermined time threshold, such as 30 days, by deployment purge process 2300, as referenced in FIG. 8.

FIG. 12 is a diagram of an exemplary routelog service flow for updating pages, consistent with disclosed embodiments. A routelog may be a JavaScript Object Notation (JSON) representation of all pages, containing hierarchical structure (e.g., parent page or child page) and all associated components (e.g., micro-applications UIs) of the pages. FIG. 12 illustrates the functionality of routelog service application 5000, which may be responsible for updating routelog in responding to routelog request 3210 from scheduler service app 3100. Routelog service application 5000 retrieves page file information from source code repository 7000, processes the page file information through the routelog update process 5300. Routelog update process 5300 may refer to a process to update the routelog based on the page file information received from source code repository 7000. The processed page information may be then transmitted to health API 2000. As a result, routelog service application 5000 facilitates the updating of routelog and ensures that the accurate and up-to date information may be transmitted to the appropriate destination.

The routelog service flow includes scheduler service app 3100, routelog service application 5000, source code repository 7000, and health API 2000. Certain elements of FIG. 12 have previously been described herein and may not be described again in detail.

As shown in FIG. 12, routelog service application 5000 may include routelog API 5100, routelog client 5200, and routelog update process 5300. Routelog API 5100 may accept routelog request 3210 from scheduler service app 3100 and pass a 200-status code back to schedule service app 3100. The 200-status code may mean the request was successfully received. Routelog API 5100 may further initiate routelog 5101 to start routelog update process 5300. Commence the execution of start routelog 5101 within routelog API 5100, whereby it may receive and process the request and initiate GET page 5302 in routelog update process 5300.

In some embodiments, routelog clients 5200 may include clients that may make requests to the API to retrieve some information or change something within the application. Routelog clients 5200 may include source code repository API client 5210 and health API client 5220. Source code repository API client 5210 may retrieve page file information from source code repository 7000. Health API client 5220 may send a request to Health API 2000 with the updated page information in the body of the request message.

Source code repository 7000 may be a centralized location where developers may store and manage their source code. This repository may serve as a secure and organized platform for developers to collaborate and work on their code. In some embodiments, source code repository 7000 may enable users to review or retrieve code, while controlling read and write access to the code. Source code repository 7000 may enable users to control who has access to their code and what level of access they have.

As shown in FIG. 12, source code repository 7000 may include page information that may include page index file 7100, page module files 7200, and component files 7300. Page index file 7100 may include a record of all existing pages. Page module file 7200 may include page attributes, such as HTML and typescript files associated with a page. In some embodiments, the page attributes can serve as a means to distinguish multiple pages by designating them as either a parent page or a sub-page of another page. This allows for the identification of a hierarchical organization of pages, where a parent page may have one or more associated sub-pages. The page attributes may be used to establish the relationship between the parent page and its sub-pages, making it easier to navigate through the digital application system. Component file 7300 may include component attributes, such as HTML and typescript files associated with one or more components. The components may be one or more of a UI, an outer API, an inner API, or one or more micro-applications that are being hosted on the page. In some embodiments, component file 7300 may further include the component structure that provides information about the structure information of the hosted at least one micro-application of each page of the plurality of pages. This structure information may include details about the layout of the micro-application. As explained hereafter, the routelog may be updated based on source code repository 7000 associated with the digital application system. Source code repository 7000 may include a page index file 7100, one or more page model files 7200, and one or more component files 7300.

In some embodiments, routelog update process 5300 may include a process flow to update routelog with the latest page information. Routelog update process 5300 may include a step of GET page 5302 to obtain the latest page information by retrieving a record of all existing pages in page index file 7100 via source code repository API client 5210.

In some embodiments, the process may involve obtaining the most recent page information from page index file 7100. Once this information may be obtained, routelog update process 5300 may iterate through each page 5304, starting from step 5310 and ending at step 5340. Each page 5304 may contain all of the existing pages that may be listed on page index file 7100, which may be obtained by GET page 5302.

Specifically, as illustrated in FIG. 12, module scraping step 5310 may include a range of processes to extract page information from page module file 7200 of source code repository 7000 and import it into routelog. The processes may include retrieving HTML and typescript files associated with a particular page from page module file 7200 via source code repository API client 5210. HTML and Typescript files associated with a particular page may then be utilized to extract page attributes. Module scraping step 5310 may further extract the information of the path and any installed components associated with the page and add the page's attributes with the path and any installed components, then save the page attributes in the routelog.

In the subsequent route structure step 5320, routelog update process 5300 may determine whether the page is a sub-page of another page. If it is determined that the page is indeed a sub-page, routelog update process 5300 may then set the parent page attribute for the current page using the information of the parent page. This means that the current page will be linked to its parent page, allowing for easier navigation and identifying the hierarchy of the pages.

In page experience collapse step 5330, if a page is determined to be a sub-page of another page in the previous step, then it may be nested in the parent's hierarchy. This means that the sub-page may be placed under the parent page in a hierarchical arrangement. Alternatively, if the page is not determined to be a sub-page, it may be designated as a parent page. This hierarchical arrangement can effectively reduce the size of the initial page array, as certain pages are now nested under others. This hierarchical arrangement of pages can effectively reduce the size of the initial page array. By nesting certain pages under others, the number of pages in the array can be reduced, making it more manageable and easier to navigate. This can be particularly useful in situations where there are a large number of pages to be displayed, as it can help to organize them in a logical and intuitive way.

Finally, in the tagging step 5340, for each component associated with a page, the component's source typescript and HTML files may be retrieved from component file 7300 of source code repository 7000. This retrieval involves obtaining the source typescript and HTML files that define each component, which may contain metadata pertaining to the component. The metadata of each component may be added to the page attributes. For example, this step may include adding the metadata of each UI that is hosted on the page to the page attributes.

Following completion of steps 5310-5340 for each page, routelog update process 5300 may return the aggregated page information as aggregated and export routelog 5306, then send aggregated and export routelog 5306 to an application, such as health API 2000, via health API client 5220. The destination of aggregated and export routelog 5306 may be defined in the redirection header of routelog request 3210. Sending aggregated and export routelog 5306 to health API 2000 may be achieved by initiating a POST request 5400 to page update controller 2402 of health API 2000. A POST request may refer to a request method that may send data to a destination with the data stored in the body of the request message.

In some embodiments, as illustrated in FIG. 8 and FIG. 9, health API 2000 may utilize page information of the aggregated and export routelog 5306 from routelog service application 5000 to update the page information in the database 4000 through page update process 2100. By utilizing the page information obtained from the routelog service application 5000, the health API 2000 may be able to ensure that the page information stored in the database 4000 may be accurate and up-to-date, which may be essential for ensuring the proper functioning of the system as a whole.

Figure 13:
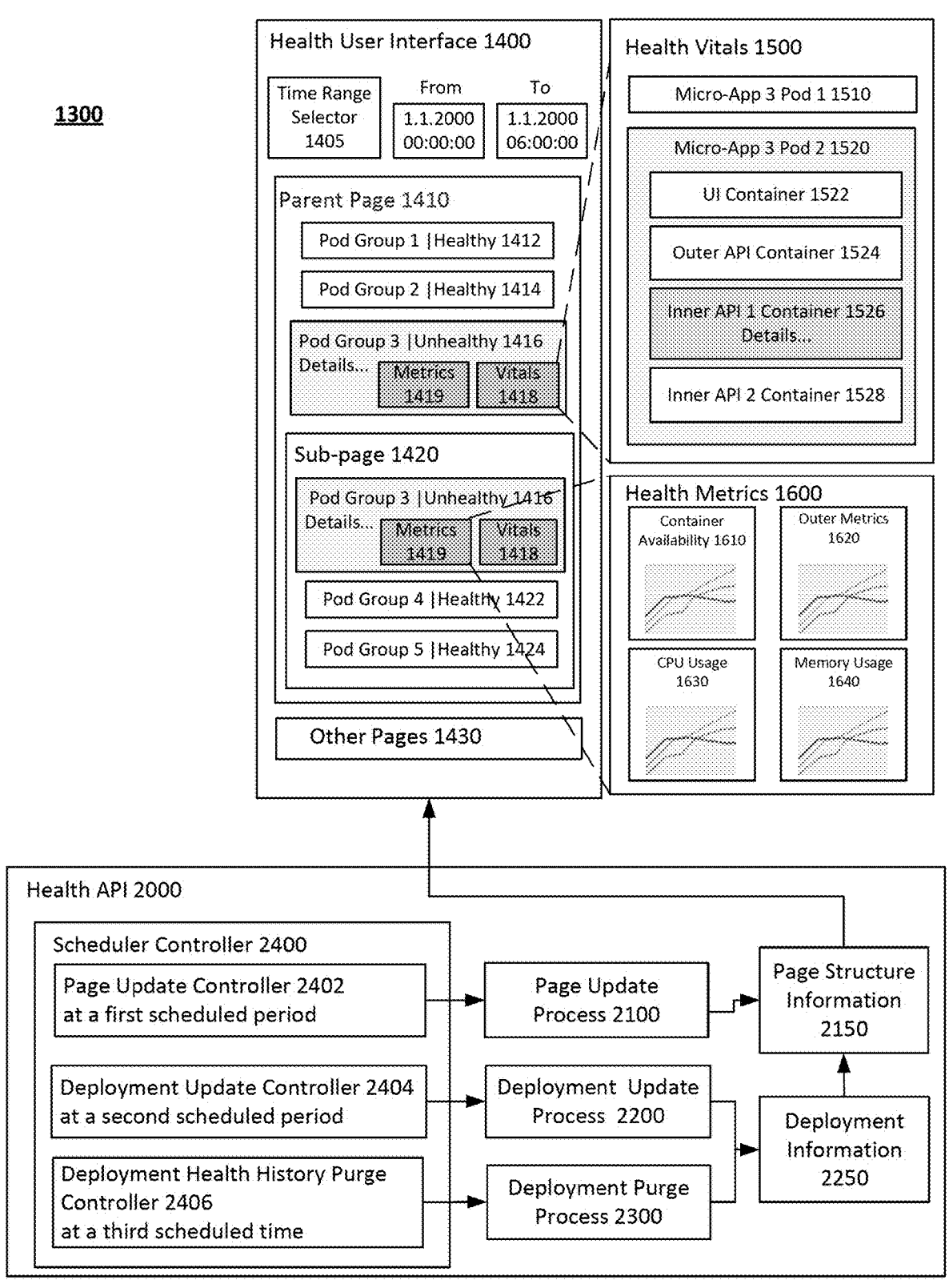
FIG. 13 is a diagram of an exemplary system for monitoring health of a digital application system, consistent with disclosed embodiments.

FIG. 13 illustrates a diagram of an exemplary system for monitoring the health of a digital application system, consistent with and aligning with disclosed embodiments. FIG. 13 incorporates elements of FIGS. 4-12, as described herein. A computer system, e.g., health user interface 1400, for monitoring the health of a digital application system (DAS), may include a memory storing instructions. In some embodiments, the memory storing instructions may provide at least one processor configured to execute the stored instructions. The stored instructions may include a health user interface 1400 configured to display a plurality of pages (e.g., parent page 1410, sub-page 1420). Each of the plurality of pages may include at least one deployment (e.g., pod group 1, pod group 2, etc.), and the at least one deployment may be marked in the user interface responsive to the deployment's health status. The deployment's health status may include, such as, healthy or unhealthy (e.g., healthy 1412 or unhealthy 1416), with light shade or dark shade. The light shade or dark shade may be replaced by any pattern and/or color to provide an immediately recognizable visual distinction between unhealthy deployments from healthy deployments.

At least one deployment (e.g., pod group 1, pod group 2, etc.), may include a list of a plurality of pods (e.g., micro-app 3 pod 1, micro-app 3 pod 2). Each of the plurality of pods may include a plurality of containers (e.g., UI container 1522, outer API container 1524, inner API 1 container 1526, and inner API container 1528, etc.). Each of the plurality of containers may have an option to further display health information (e.g., health vital 1500), and monitoring results (e.g., health metrics 1600).

A health application programming interface (API) (e.g., health API 2000) may host a page update process 2100, a deployment update process 2200, and a deployment health history purge process 2300. The health API 2000 may be configured to link page structure information 2150 and deployment information 2250 to display on the health user interface 1400. Page structure information 2150 may refer to structure relationship and hierarchy information (e.g., parent page or child page) for the pages in a digital application system. Deployment information 2250 may refer to the information of deployment status retrieved from the deployment application for the components and pages.

Page update process 2100 may be configured to update a plurality of pages based on a routelog run by a first scheduled period via page update controller 2402. A routelog may refer to a JavaScript Object Notation (JSON) representation of all pages, containing hierarchical structure (e.g., parent page or child page) and all associated components (e.g., micro-applications UIs) of the pages. The deployment update process 2200 may be configured to update deployment information from a deployment API 1270 (as shown in FIG. 8) through a deployment client 2700 (as shown in FIG. 8) by a second scheduled period via deployment update controller 2404. Deployment health history purge process 2300 may be configured to delete one or more deployment entries older than a predetermined date determined by a third scheduled period via deployment health history purge controller 2406.

As illustrated in FIG. 13, a computer-implemented method or operations for monitoring health of a digital application system may be performed by at least one processor. In some embodiments, a non-transitory computer readable medium may contain instructions that when executed by a processor cause the processor to perform the method or operations for monitoring health of a digital application system, consistent with disclosed embodiments. The exemplary method or operations 1300 for monitoring the health of a digital application system, may include displaying a plurality of pages (e.g., parent page 1410, sub-page 1420) on a health user interface 1400 with the deployment information (e.g., pod group 1, pod group 2, etc.).

Consistent with disclosed embodiments, the exemplary method or operation 1300 for monitoring the health of a digital application system, may use a health API 2000 to host a page update process 2100, a deployment update process 2200, and a deployment health history purge process 2300.

Systems and methods disclosed herein involve unconventional improvements over conventional approaches. Descriptions of the disclosed embodiments are not exhaustive and are not limited to the precise forms or embodiments disclosed. Modifications and adaptations of the embodiments will be apparent from consideration of the specification and practice of the disclosed embodiments. Additionally, the disclosed embodiments are not limited to the examples discussed herein.

The present disclosure has been presented for purposes of illustration. It is not exhaustive and is not limited to precise forms or embodiments disclosed. Modifications and adaptations of the embodiments will be apparent from consideration of the specification and practice of the disclosed embodiments. For example, the described implementations include hardware, but systems and methods consistent with the present disclosure may be implemented with hardware and software. In addition, while certain components have been described as being coupled to one another, such components may be integrated with one another or distributed in any suitable fashion.

Moreover, while illustrative embodiments have been described herein, the scope includes any and all embodiments having equivalent elements, modifications, omissions, combinations (e.g., of aspects across various embodiments), adaptations and/or alterations based on the present disclosure. The elements in the claims are to be interpreted broadly based on the language employed in the claims and not limited to examples described in the present specification or during the prosecution of the application, which examples are to be construed as nonexclusive. Further, the steps of the disclosed methods may be modified in any manner, including reordering steps and/or inserting or deleting steps.

The features and advantages of the disclosure are apparent from the detailed specification, and thus, it is intended that the appended claims cover all systems and methods falling within the true spirit and scope of the disclosure. As used herein, the indefinite articles "a" and "an" mean "one or more." Similarly, the use of a plural term does not necessarily denote a plurality unless it is unambiguous in the given context. Words such as "and" or "or" mean "and/or" unless specifically directed otherwise. Further, since numerous modifications and variations will readily occur from studying the present disclosure, it is not desired to limit the disclosure to the exact construction and operation illustrated and described, and accordingly, all suitable modifications and equivalents may be resorted to, falling within the scope of the disclosure.

Other embodiments will be apparent from consideration of the specification and practice of the embodiments disclosed herein. It is intended that the specification and examples be considered as example only, with a true scope and spirit of the disclosed embodiments being indicated by the following claims.

According to some embodiments, the operations, techniques, and/or components described herein may be implemented by a device or system, which may include one or more special-purpose computing devices. The special-purpose computing devices may be hard-wired to perform the operations, techniques, and/or components described herein, or may include digital electronic devices such as one or more application-specific integrated circuits (ASICs) or field programmable gate arrays (FPGAs) that are persistently programmed to perform the operations, techniques and/or components described herein, or may include one or more hardware processors programmed to perform such features of the present disclosure pursuant to program instructions in firmware, memory, other storage, or a combination. Such special-purpose computing devices may also combine custom hard-wired logic, ASICs, or FPGAs with custom programming to accomplish the technique and other features of the present disclosure. The special-purpose computing devices may be desktop computer systems, portable computer systems, handheld devices, networking devices, or any other device that may incorporate hard-wired and/or program logic to implement the techniques and other features of the present disclosure.

The one or more special-purpose computing devices may be generally controlled and coordinated by operating system software, such as Apple IOS, Android, Blackberry, Chrome OS, Windows XP, Windows Vista, Windows 7, Windows 8, Windows Server, Windows CE, Unix, Linux, SunOS, Solaris, VxWorks, or other compatible operating systems. In other embodiments, the computing device may be controlled by a proprietary operating system. Operating systems may control and schedule computer processes for execution, perform memory management, provide file system, networking, I/O services, and provide a user interface functionality, such as a graphical user interface ("GUI"), among other things.

The disclosed embodiments may be implemented in a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may include copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein includes an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowcharts and block diagrams in the Figures illustrate the architecture, functionality, and operation of possible implementations of systems, methods and computer program products according to various embodiments of the present invention. In this regard, each block in the flowcharts or block diagrams may represent a software program, segment, or portion of code, which includes one or more executable instructions for implementing the specified logical function(s). It should also be noted that, in some alternative implementations, the functions noted in the block may occur out of the order noted in the figures. Some steps may be deleted, added, or modified. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Furthermore, although aspects of the disclosed embodiments are described as being associated with data stored in memory and other tangible computer-readable storage mediums, one skilled in the art will appreciate that these aspects may also be stored on and executed from many types of tangible computer-readable media, such as secondary storage devices, like hard disks, floppy disks, or CD-ROM, or other forms of RAM or ROM. Accordingly, the disclosed embodiments are not limited to the above described examples, but instead are defined by the appended claims in light of their full scope of equivalents.

It is intended, therefore, that the specification and examples be considered as example only, with a true scope and spirit being indicated by the following claims and their full scope of equivalents.

What is claimed is:

1. A computer system for monitoring health of a digital application system, comprising:
a memory storing instructions; and
at least one processor configured to execute the memory stored instructions to provide:
a health user interface configured to display a plurality of pages, wherein:
each of the plurality of pages includes at least one deployment, and the at least one deployment is marked in the user interface responsive to health status, and
the at least one deployment includes a list of a plurality of pods, each of the plurality of pods including a plurality of containers with an option to display health information and monitoring results of each of the plurality of containers; and
a health application programming interface (API) hosting a page update process, a deployment update process, and a deployment health history purge process, the health API configured to link page structure information and deployment information to display on the health user interface,
wherein:
the page update process is configured to update a plurality of pages based on a routelog run by a first scheduled period and save the updated plurality of pages to a database, and the routelog is generated based on a page index file, one or more page model files, and one or more component files associated with the digital application system;
the deployment update process is configured to update deployment information from a deployment API through a deployment client by a second scheduled period; and
the deployment health history purge process is configured to delete one or more deployment entries older than a predetermined date by a third scheduled period.

2. The computer system of claim 1, further comprising a scheduler controller configured to determine the first scheduled period, the second scheduled period and the third scheduled period.

3. The computer system of claim 2, wherein the scheduler controller is configured to run at least one of the page update process, the deployment update process, and the deployment health history purge process at a predetermined interval.

4. The computer system of claim 1, wherein each page of the plurality of pages is configured to host at least one micro-application.

5. The computer system of claim 4, wherein each micro-application is configured to be hosted on at least one page of the plurality of pages.

6. The computer system of claim 1, wherein the routelog includes page information including page attributes and a component structure.

7. The computer system of claim 6, wherein the page attributes identify at least one of: the plurality of pages as a parent page or a sub-page of another page.

8. The computer system of claim 6, wherein the component structure includes the structure information of the hosted at least one micro-applications of each page of the plurality of pages.

9. The computer system of claim 1, wherein the monitoring results of each container includes at least one of availability percentage, memory usage, CPU usage, outer metrics, response count, median response time, and $90^{th}$ percentile response time.

10. A computer-implemented method for monitoring health of a digital application system performed by at least one processor, the method comprising:
displaying, using a health user interface, a plurality of pages, wherein:
each of the plurality of pages includes at least one deployment, and the at least one deployment is marked in the user interface responsive to health status, and
the at least one deployment includes a list of a plurality of pods, each of the plurality of pods including a plurality of containers with an option to display health information and monitoring results of each of the plurality of containers; and
hosting, using a health application programming interface (API), a page update process, a deployment update process, and a deployment health history purge process, the health API configured to link page structure information and deployment information to display on the health user interface,
wherein:
the page update process is configured to update a plurality of pages based on a routelog run by a first scheduled period and save the updated plurality of pages to a database, and the routelog is generated based on a page index file, one or more page model files, and one or more component files associated with the digital application system,
the deployment update process is configured to update deployment information from a deployment API through a deployment client by a second scheduled period, and
the deployment health history purge process is configured to delete one or more deployment entries older than a predetermined date by a third scheduled period.

11. The method of claim 10, further comprising a scheduler controller configured to determine the first scheduled period, the second scheduled period and the third scheduled period.

12. The method of claim 11, wherein the scheduler controller is configured to run at least one of the page update process, the deployment update process, and the deployment health history purge process at a predetermined interval.

13. The method of claim 10, wherein each page of the plurality of pages is configured to host at least one micro-application.

14. The method of claim 13, wherein each micro-application is configured to be hosted on at least one page.

15. The method of claim 10, wherein the routelog includes page information including page attributes and a component structure.

16. The method of claim 15, wherein the page attributes identify at least one of the plurality of pages as a parent page or a sub-page of another page.

17. The method of claim 15, wherein the component structure includes the structure information of the hosted at least one micro-applications of each page of the plurality of pages.

18. A non-transitory computer readable medium storing instructions that, when executed by at least one processor, provide operations for monitoring health of a digital application system, the operations comprising:

displaying, using a health user interface, a plurality of pages, wherein:

each of the plurality of pages includes at least one deployment, and the at least one deployment is marked in the user interface responsive to health status, and the at least one deployment includes a plurality of pods, each of the plurality of pods including a plurality of containers with an option to display health information and monitoring results of each of the plurality of container; and hosting, using a health application programming interface (API), a page update process, a deployment update process, and a deployment health history purge process, the health API configured to link page structure information and deployment information to display on the health user interface, wherein:

the page update process is configured to update a plurality of pages based on a routelog run by a first scheduled period and save the updated plurality of pages to a database, and the routelog is generated based on a page index file, one or more page model files, and one or more component files associated with the digital application system, the deployment update process is configured to update deployment information from a deployment API through a deployment client by a second scheduled period, and the deployment health history purge process is configured to delete one or more deployment entries older than a predetermined date by a third scheduled period.

\* \* \* \* \*